(12) United States Patent
Mayer et al.

(10) Patent No.: US 10,341,083 B2
(45) Date of Patent: Jul. 2, 2019

(54) SYSTEM AND METHODS FOR NETWORK SYNCHRONIZATION

(71) Applicants: Michael Mayer, Ottawa (CA); Hamid Mehrvar, Ottawa (CA)

(72) Inventors: Michael Mayer, Ottawa (CA); Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/607,031

(22) Filed: May 26, 2017

(65) Prior Publication Data

US 2018/0076949 A1    Mar. 15, 2018

Related U.S. Application Data

(63) Continuation-in-part of application No. 15/261,401, filed on Sep. 9, 2016.

(51) Int. Cl.
*H04B 10/40* (2013.01)
*H04L 7/00* (2006.01)
(Continued)

(52) U.S. Cl.
CPC ....... *H04L 7/0075* (2013.01); *H04B 10/2507* (2013.01); *H04B 10/40* (2013.01); *H04J 3/0667* (2013.01)

(58) Field of Classification Search
CPC ...... H04J 3/0667; H04J 3/0682; H04J 3/0635; H04J 3/0697; H04B 10/27; H04B 10/25; H04B 10/40; H04L 7/0075; H04L 43/0864
(Continued)

(56) References Cited

U.S. PATENT DOCUMENTS 7,710,941 B2    5/2010  Rietschel et al.
8,416,812 B2 *  4/2013  Radulescu ............ H04J 3/0667
                                                370/503
(Continued)

FOREIGN PATENT DOCUMENTS

CN    101098219 A    1/2008
CN    102412955 A    4/2012
(Continued)

OTHER PUBLICATIONS

International Search Report dated May 4, 2017 for corresponding International Application No. PCT/CN2016/099731 filed Sep. 22, 2016.
(Continued)

*Primary Examiner* — Emmanuel Bayard

(57) ABSTRACT

One aspect of the disclosure is directed to a system and method for determining the propagation delay for a signal to traverse an optical fiber between two transceivers. The method is performed by a first network element and includes transmitting a message to a second transceiver over a first optical fiber. The method further includes configuring both network elements such that the first NE receives a reply message from the second NE on the first optical fiber. This reply message includes an indication of the internal time for the second NE to transmit the reply message. Accordingly the one way propagation delay on the first optical fiber can be determined. Another aspect is directed to a system and method for using the determined one way propagation delay to synchronize clocks of the two NEs using a symmetric network synchronizing protocol such as precision timing protocol, and correcting for differences in the one way propagation delays which make up the round trip propagation delay. Some embodiments can do this without stopping
(Continued)

the operation of the network while pausing (buffering) data flows while the one way propagation delays are determined.

20 Claims, 15 Drawing Sheets

(51) Int. Cl.
*H04B 10/2507* (2013.01)
*H04J 3/06* (2006.01)

(58) Field of Classification Search
USPC .................................. 375/219–222, 354–357
See application file for complete search history.

(56) References Cited

U.S. PATENT DOCUMENTS

| | | | |
|---|---|---|---|
| 9,130,670 B2 | 9/2015 | Jobert et al. | |
| 2007/0147562 A1 | 6/2007 | Eidson | |
| 2010/0085989 A1* | 4/2010 | Belhadj | H04J 3/0667 370/503 |
| 2012/0170631 A1* | 7/2012 | Liu | H04J 3/0667 375/224 |
| 2012/0224846 A1 | 9/2012 | Swanson et al. | |
| 2012/0263220 A1* | 10/2012 | Li | H04W 56/00 375/224 |
| 2012/0275501 A1 | 11/2012 | Rotenstein | |
| 2013/0039359 A1 | 2/2013 | Bedrosian | |
| 2013/0195443 A1 | 8/2013 | Yin et al. | |
| 2013/0202291 A1* | 8/2013 | Cavaliere | H04B 10/07 398/33 |
| 2013/0209096 A1* | 8/2013 | Le Pallec | H04J 3/0667 398/35 |
| 2014/0064303 A1 | 3/2014 | Aweya et al. | |
| 2014/0079409 A1* | 3/2014 | Ruffini | H04J 3/065 398/154 |
| 2014/0146811 A1* | 5/2014 | Wen | H04J 3/0667 370/350 |
| 2014/0169792 A1 | 6/2014 | Lee et al. | |
| 2014/0348181 A1* | 11/2014 | Chandra | H04J 3/0667 370/503 |
| 2014/0348182 A1* | 11/2014 | Chandra | H04J 3/0697 370/503 |
| 2015/0092794 A1* | 4/2015 | Aweya | H04J 3/0667 370/503 |
| 2015/0098476 A1* | 4/2015 | Reese | H04L 43/0817 370/401 |
| 2015/0229388 A1* | 8/2015 | Xu | H04B 10/071 398/29 |
| 2015/0295669 A1 | 10/2015 | Chapman et al. | |
| 2015/0304066 A1* | 10/2015 | Dutti | H04L 43/0864 398/98 |
| 2015/0372776 A1* | 12/2015 | He | H04L 5/1469 398/28 |
| 2016/0170440 A1 | 6/2016 | Aweya | |
| 2016/0211936 A1* | 7/2016 | Bottari | H04J 3/0641 |
| 2018/0003838 A1 | 1/2018 | Morris et al. | |
| 2018/0034542 A1* | 2/2018 | Fung | H04B 10/075 |
| 2018/0191802 A1 | 7/2018 | Yang et al. | |

FOREIGN PATENT DOCUMENTS

| | | |
|---|---|---|
| CN | 102742190 A | 10/2012 |
| CN | 103119872 A | 5/2013 |
| EP | 2615752 A1 | 7/2013 |
| WO | 2015024599 A1 | 2/2015 |

OTHER PUBLICATIONS

International Search Report dated Oct. 27, 2017 for corresponding International Application No. PCT/CN2017/097120 filed Aug. 11, 2017..
IEEE Standard for a Precision Clock Synchronization Protocol for Networked Measurement and Control, IEEE std 1588, Jul. 24, 2008.
Serrano, J. et al., The White Rabbit Project, 2013 (https://www.ohwr.org/projects/white-rabbit/wiki/WRpublications).
Garner, G.M., Upldate on High Accuracy Work in IEEE P1588 Working Group, IEEE 802.1 AVB TG, Jan. 19, 2014.

* cited by examiner

SYSTEM AND METHODS FOR NETWORK SYNCHRONIZATION

CROSS REFERENCE TO RELATED APPLICATIONS

This application is a Continuation-In-Part of U.S. patent application Ser. No. 15/261,401 filed on Sep. 9, 2016 and entitled "SYSTEM AND METHODS FOR DETERMINING PROPAGATION DELAY", the contents of which are incorporated herein by reference.

FIELD OF THE INVENTION

The present invention pertains to the field of communication networks, and in particular to network synchronization.

BACKGROUND

Next generation networks, including next generation wireless networks are expected to require clock synchronization between network elements within the network. Such network elements can include base stations, remote radio heads, Cloud Radio Access Network (C-RAN) data center baseband units (BBUs), and the like. Next generation of wireless networks are expected to utilize optical fibers to connect transceivers at antennas to transceivers at base stations or C-RAN BBUs.

Optical communication systems typically involve each optical fiber transmitting signals in a single direction. Accordingly two different optical fibers are used for two-way transmission between transceivers.

These network elements (also called nodes) have in the past been synchronized using synchronization based on a Global Navigation Satellite System (GNSS). Global Positioning Satellite (GPS) synchronization is one example. However, GPS/GNSS may not be available at indoor locations, or due to antenna access issues. Further, recently there have been security concerns regarding GPS synchronization. Furthermore GPS synchronization requires costly GPS receivers at each node. In a network of nodes using GPS synchronization, each node in the network receives signals from satellites, and in accordance with the received signals (and optionally in accordance with a known position), a time value can be obtained. The local clock at the node is then synchronized to this time. When each node in the network synchronizes in the same manner, they can each be considered to be synchronized with the GPS system, and thus sufficiently synchronized to each other. Use of an over-the-air channel for synchronization makes nodes subject to jamming of the synchronization signals which could result in a node going offline.

Accordingly, there is a need for a system and method that at least partially addresses one or more limitations of the prior art. In particular there is a need for a system and method for providing accurate clock synchronization for next generation wireless networks and other networks without relying on GPS synchronization.

This background information is provided to reveal information believed by the applicant to be of possible relevance to the present invention. No admission is necessarily intended, nor should be construed, that any of the preceding information constitutes prior art against the present invention.

SUMMARY

One aspect of the disclosure is directed to a system and method for determining the propagation delay for a signal to traverse an optical fiber between two transceivers, and for using the determined propagation delay to synchronize the two transceivers.

In a first aspect of the present invention, there is provided a method for synchronizing clocks between nodes or network elements in a network. The method can be performed by a first node, or by a controller associated with the first node. The first node has a transceiver that can be connected to a second node by a first optical fiber and a second optical fiber. The method comprises receiving a control message, containing an instruction to send to the second node a symmetric network synchronizing protocol clock synchronizing message; subsequent to receiving the control message, determining a one way asymmetric propagation delay associated with the first optical fiber; and transmitting the clock synchronizing message, to the second node over the first optical fiber, with a correction value determined in accordance with the determined one way asymmetric delay.

In an embodiment of the first aspect, determining the asymmetric propagation delay can comprise transmitting a timing message to the second node on the first optical fiber; changing a mode of operation of a transceiver of the first node from a normal mode of operation to a second mode of operation to allow reception of a response to the transmitted timing message on the first optical fiber; and determining the one way asymmetric delay for the first optical fiber in accordance with a received response to the transmitted timing message. In some embodiments this may optionally include determining that asymmetric propagation delay further comprises reverting the mode of operation from the second mode of operation to the normal mode of operation after receiving the response to the transmitted timing message. In another embodiment, the method can further comprise determining a one way asymmetric propagation delay associated with the second optical fiber in accordance with a determined round trip delay and the determined one way asymmetric delay of the first optical fiber. In a further embodiment the method can further comprise buffering data traffic during the determination of the one way asymmetric propagation delay associated with the first optional fiber. In another embodiment, the control message is received responsive to at least one of: a measured change in temperature exceeding a threshold; and a measured drop in data traffic below a threshold.

In a further embodiment, timing synchronization using the symmetric network synchronizing protocol is subject to error associated with an asymmetry in the propagation delays between the first optical fiber and the second optical fiber. Optionally, the symmetric network synchronizing protocol includes a correction field to compensate for propagation delays between the first and second nodes, and wherein the method further includes updating the correction field with the correction value. In a further embodiment, the symmetric network synchronizing protocol is a precision time protocol or a network time/timing protocol.

In a further embodiment, both the first node and the second node comprise a transceiver including a 2×2 switch for switching a connection from either of the pair of optical fibers and a transmit portion of the transceiver and a receive portion of the transceiver, and changing the mode of operation further comprises switching the state of the 2×2 switches between a transmit step and a receive step such that both a transmit message and a receive message traverse the same optical fiber.

In a second aspect of the present invention, there is provided a method for synchronizing clocks between a first network element, a second network element and a third network element, the first network element transmitting data traffic to the second network element on a first optical fiber in a normal mode of operation and a receiving data traffic from the second network element on a second optical fiber and the first network element transmitting data traffic to the third network element on a third optical fiber and receiving data traffic from the third network element on a fourth optical fiber in a normal mode of operation, the method performed by the first network element. The method comprises receiving a first clock synchronizing message from the second network element using a symmetric network synchronizing protocol, the first clock synchronizing message including a first correction value in accordance with a determined first offset adjustment; receiving a second clock synchronizing message from the third network element using a symmetric network synchronizing protocol, the second clock synchronizing message including a second correction value in accordance with a determined second offset adjustment; and synchronizing the clock of the first network element to the clock of one of the second network element and the third network element. The first offset adjustment depends on differences in propagation delay between the first network element and the second network element on the first optical fiber and between the first network element and the second element on the second optical fiber. The second offset adjustment depends on differences in propagation delay between the first network element and the third network element on the third optical fiber and between the first network element and the third network element on the fourth optical fiber.

In an embodiment of the second aspect, the symmetric network synchronizing protocol synchronizes different network elements to a clock of a master network element and wherein synchronizing the clock of the first network element to the clock of one of the second network element and the third network element includes synchronizing to the clock of the network element with the least number of hops from the master network element. In a further embodiment, the method further comprises: receiving the number of hops between the second network element and the master network element; and receiving the number of hops between the third network element and the master network element. In a further embodiment, the first offset adjustment is determined responsive to the first network element and the second network element exchanging messages in a second mode of operation; and the second offset adjustment is determined responsive to the first network element and the third network element exchanging messages in a third mode of operation.

In a third aspect of the present invention, there is provided a network element that comprises an interface, a transceiver and a controller. The interface can be used for receiving data traffic to be transmitted over a first optical fiber. The transceiver is used for transmitting over the first optical fiber and receiving over a second optical fiber. The controller includes a processor and machine readable memory storing machine executable instructions which when executed by the processor cause the controller to configure the network element to: receive a control message, containing an instruction to send to the second node a symmetric network synchronizing protocol clock synchronizing message; subsequent to receiving the control message, determine a one way asymmetric propagation delay associated with the first optical fiber; and transmit the clock synchronizing message, to the second node over the first optical fiber, with a correction value determined in accordance with the determined one way asymmetric delay.

In an embodiment of the third aspect, the machine readable instructions which cause the controller to determine the asymmetric propagation delay further comprises instructions which cause the controller to configure the network element to: transmit a timing message to the second node on the first optical fiber; change a mode of operation of the transceiver from a normal mode of operation to a second mode of operation to allow reception of a response to the transmitted timing message on the first optical fiber; and determine the one way asymmetric delay for the first optical fiber in accordance with a received response to the transmitted timing message. In another embodiment, changing the mode of operation further includes buffering data traffic during the second mode of operation. In a further embodiment, the symmetric network synchronizing protocol includes a correction field to compensate for different propagation on the first optical fiber and the second optical fiber and wherein the machine readable instructions further cause the controller to update the correction field with the correction value. In a further embodiment, the symmetric network synchronizing protocol is a precision time protocol. In another embodiment, the network element is configured to operate in a master mode. In a further embodiment, the network element is configured to operate in a slave mode.

Those skilled in the art will appreciate that embodiments of the aspects described above may be implemented in conjunction with the aspect with which they have been described, and may also be implemented in conjunction with features from other embodiments. Where different embodiments include features that are mutually exclusive, those skilled in the art will appreciate that the embodiments cannot be combined. Some embodiments may be applied to aspects with which they have not been explicitly described in relation to, as well as with the embodiments of those aspects.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
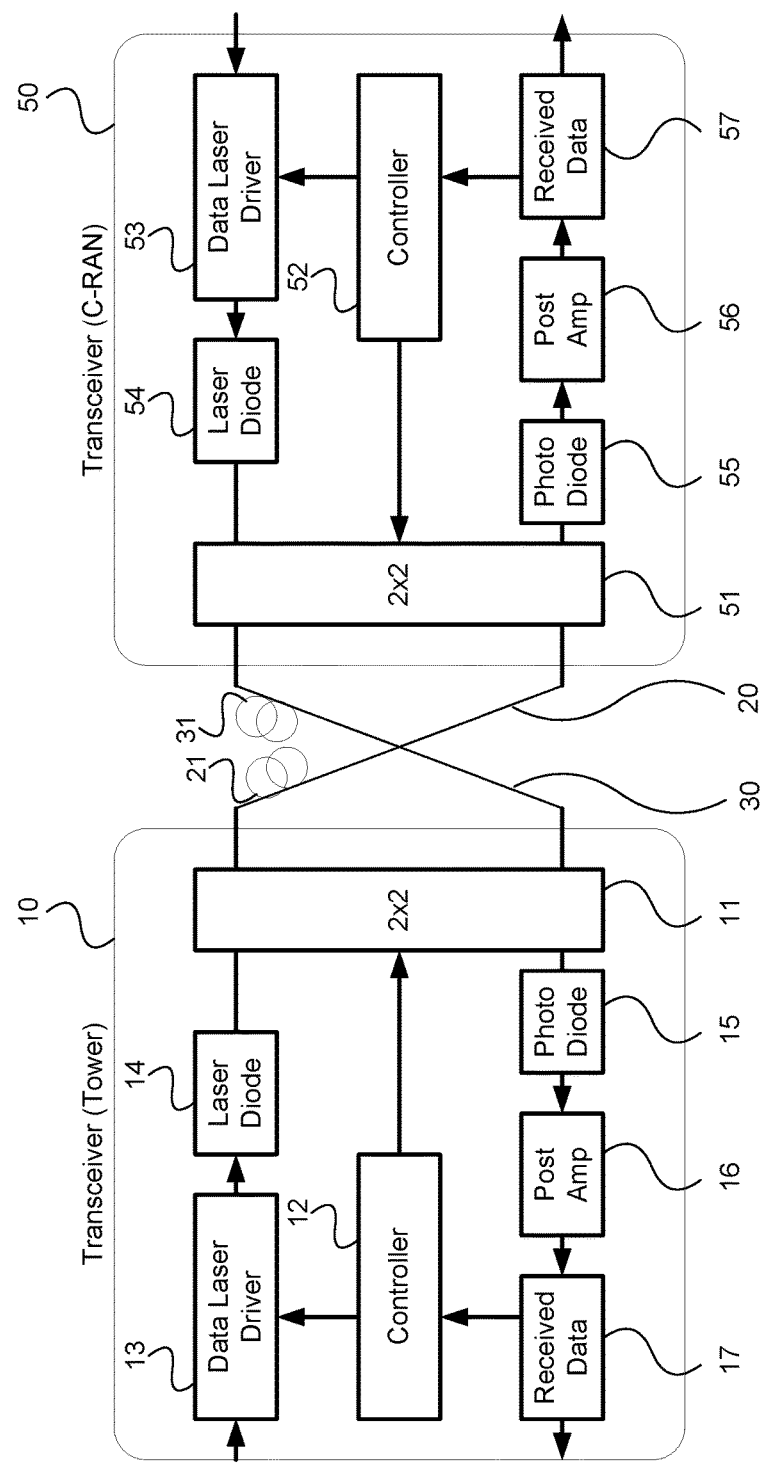
FIG. 1 illustrates a first transceiver connected to a second transceiver by a pair of optical fibers according to an embodiment.

Embodiments will be discussed with reference to specific examples of use within next generation wireless networks, due to precise synchronization requirements of such networks. For example, it is expected that next generation of wireless networks that utilize optical fronthaul connections from an antenna to a base station (or from a remote radio head to a C-RAN cluster) will have synchronization requirements in the order +/−8 nsec. However it should be appreciated that the methods and systems described herein are not limited to next generation wireless systems and can be utilized in other systems with precise timing requirements, such as some industrial applications or servers used for financial services with timing requirements for settling financial transactions.

Some embodiments are directed to methods and systems of synchronizing network elements without requiring each network element to rely upon an over-the-air connection to a master clock (e.g. relying on GPS receivers and decoders to obtain a timing signal). If implemented without fall back to a legacy GPS-base synchronization system, implementation of this method may allow for the elimination of the need for using GPS receivers, and a commensurate reduction in the cost of implementation. Furthermore, such systems can be more secure as GPS systems can be vulnerable to jamming/spoofing attacks.

Accordingly some networks utilize symmetric network synchronizing protocols which utilize two-way time-transfer techniques. In such systems, time is a construct that is represented by a sequence number. Two clocks are considered to be synchronized when they generate the same sequence number at the same instance of time. In a synchronization method between a first node (Node A) and a second node (Node B), the first node transmits a packet (also referred to as a first message) including a first timestamp, T1. T1 represents the time the packet was sent relative to the internal time-base of Node A. The second node, upon receipt of the packet, generates time-stamp T2. T2 is a timestamp relative to the time-base of Node B indicative of the time of receipt of the initial message. The second node will then, when ready to send a reply message, will include with or within the reply message a third time-stamp (T3) representing the sending time of the reply message based on the time-base of Node B. The first node will time-stamp (T4) its reception of the reply message based on the internal time-base of Node A. The time difference between T4 an T1 defines the total round trip (total transmission) time. The difference between T3 and T2 defines the processing time at Node B. If the first node sends this time-stamp back to the second node, then the second node will have four time-stamps representing the send and receive times of the two message interchange. The second node can then determine the total transmission time. The total transmission time is composed of a transit time and the processing time (or component delay) at the second node. However, the transit time is composed of both the time from node A to node B and the time from Node B to node A. Accordingly, such systems need to determine the propagation delay (time taken for messages to propagate between devices) and component delays. A Component delay includes the time taken for messages to traverse within devices, and also includes processing delays of devices (also referred to as hardware delays and software processing time). It should be appreciated that in the above described scenario, Node B adjusts Node B's time-base to match the time-base of T1, determined based on the 4 timestamps (T1, T2, T3 and T4). It should be appreciated that as an alternative, Node B can transmit T2 in the message which includes T3. In which case, Node A, upon generating T4, possesses all 4 timestamps and can adjust its time-base accordingly. As a further alternative, Node A can determine what adjustment is needed to synchronize Node B with the current time-base of Node A, and transmit the adjustment to Node B.

Prior art methods for determining propagation delay typically measure the round trip delay by sending a signal from a first transceiver to the second transceiver in one direction using one optical fiber, and receiving a reply from the second transceiver to the first transceiver in the return direction on another optical fiber. Such symmetric network synchronizing protocols for synchronizing the clocks of the network elements are predicated on an assumption that there is a symmetric delay between the transmission in a first direction and a second direction. However these two different fibers can have different transmission characteristics, including different lengths, and therefore different propagation delays for signals that traverse the two optical fibers.

As communication systems become faster, by transmitting larger amounts of data per unit time interval, propagation delays between transmitting and receiving transceivers become more relevant. For example, an optical fiber of 2 m in length can introduce more than 10 nanoseconds (nsec) of propagation delay. However, it is expected that next generation of wireless networks that utilize optical fibers from an antenna to a base station (or from a remote radio head to a C-RAN cluster) will have synchronization requirements in the order +/−8 nsec. In such a system the difference in lengths between the two optical fibers used for the two directions between the transceivers can exceed these synchronization requirements.

Accordingly methods and systems for determining the propagation delay for each fiber and applying such methods for network scale synchronization will now be discussed, according to embodiments.

FIG. 1 illustrates a block diagram of a networking system according to an embodiment. FIG. 1 illustrates an example wherein a first transceiver 10 is located at a wireless antenna tower, for example a remote radio head, and a second transceiver 50 forms part of a C-RAN data center. The first transceiver 10 includes a controller 12 for controlling the operation of the transceiver, a 2×2 switch 11, a transmit path and a receive path. The transmit path includes a data laser driver 13 and a laser diode 14. The receive path includes a photodiode 15 for converting a received optical signal into an electric current, an amplifier 16 and a receiving data module 17 for Analog/Digital conversion and detection of bits from the electric current. Similarly the second transceiver 50 includes a controller 52, a 2×2 switch 51, a transmit path transmit path including data laser driver 53 and laser diode 54, and a receive path including a photodiode 55, an amplifier 56 and a received data module 57. The two transceivers are linked by optical fibers 20 and 30. It is noted that the figure is not to scale, and the optical fiber 20 can be much longer than the size of the transceiver, and coil 21, schematically illustrates that fiber 20 can have a length that will typically run between 10 meters (m) and 20 kilometers (km). Optical fiber 30, which is also schematically illustrated with coil 31, can have a different length that that of optical fiber 20.

The 2×2 switch 11 has two states. The first state, referred to as the bar state, links the transmit path (e.g., laser diode 14) of transceiver 10 with optical fiber 20 and links receive path (e.g., photodiode 15) of transceiver 10 with optical fiber 30. The second state, referred to as the cross state, links the transmit path (e.g., laser diode 14) of transceiver 10 with optical fiber 30 and links receive path (e.g., photodiode 15) of transceiver 10 with optical fiber 20. Similarly the 2×2 switch 51 has two states. The first state, referred to as the bar state, links the transmit path (e.g., the laser diode 54) of transceiver 50 with the optical fiber 30 and links receive path (e.g., photodiode 55) of transceiver 50 with the optical fiber 20. The second state, referred to as the cross state, links the transmit path (e.g., the laser diode 54) of the transceiver 50 with the optical fiber 20 and links the receive path (e.g., the photodiode 55) of the transceiver 50 with the optical fiber 30.

Accordingly when both switches 11, 51 are in the bar state, which will be the normal mode of operation, the transmit path (e.g., laser diode 14) of transceiver 10 is linked with receive path (e.g., photodiode 55) of the transceiver 50 via the optical fiber 20. Similarly configuring both switches 11, 51 in the bar state links the transmit path (e.g., laser diode 54) of transceiver 50 with receive path (e.g., the photodiode 15) of the transceiver 10 via the optical fiber 30. Configuring both switches 11, 51 in the cross state links the transmit path (e.g., laser diode 14) of the transceiver 10 with the receive path (e.g., photodiode 55) of the transceiver 50 via the optical fiber 30 and links the transmit path (e.g., laser diode 54) of the transceiver 50 with the receive path (e.g., photodiode 15) of the transceiver 10 via the optical fiber 20. Accordingly, switching the state of both switches 11, 51 effectively switches the optical fiber used for each direction of communication between the transceivers. As can be seen, switching the state of one switch (e.g. the switch 11) without making the corresponding switch in the other switch (in this example, the switch 51) is not useful, as such a state would link transmitters with transmitters and receivers with receivers. The 2×2 switches 11, 51 can be, for example, Silicon Photonic (SiPh) switches, Thermo-Optic Switches (TOS) or Carrier Injection Optical switches (CIOS).

It should be appreciated that controllers 12, 52 include a processor and machine-readable memory for storing instructions, which when executed by the processor, cause the controllers to execute the methods described herein. The controller can be implemented, for example, in a FPGA, ASIC, or SiPh/CMOS. In some embodiments, transceivers 10, 50 can form part of a pluggable transceiver such as a small form-factor pluggable (SFP) transceiver. Further it should be noted that while the transceivers 10 and 50 are shown to include controllers 12, 52, it should be appreciated that network elements may include a number of transceivers, and include one or more central controllers for controlling a plurality of different transceivers. In some embodiments, an SFP can be controlled by a network element controller, in which case the SFP need not include a controller. In other embodiments the SFP can include a controller operating under control of (or in conjunction with) the Network Element (NE) controller. In another embodiment, multiple transceivers can be integrated into a line card (with integrated optics) all controlled by a controller.

In normal operation, in this example, the tower transceiver 10 would connect to the remote radio head transceiver 50. Circuitry (not shown) converts the received wireless signals for optical transmission via the data laser driver 13 for modulating the output of the laser diode 14 for optical transmission via the optical fiber 20 to the receive path of the transceiver 50 at the C-RAN for processing and forwarding to the core network. Similarly for downlink transmissions the C-RAN transceiver 50 would transmit signals on the optical fiber 30 for wireless transmission via the receive path of the transceiver 10. In this example, both switches 11 and 51 would operate in the bar state. It should be appreciated that other components such as internal clock sources would be included in the transceivers 10, 50 but are not shown, as are components other components for end to end transmission (such as those used for converting between wireless and electrical signals).

As stated, for such operation to work effectively, the two transceivers 10, 50 should be synchronized within a small margin, which in some cases can be within 8 nsec. Embodiments provide for a method and system which can determine the propagation delay in each of optical fibers 20, 30 as part of a method and system for synchronizing the two transceivers 10, 50.

Figure 2A:
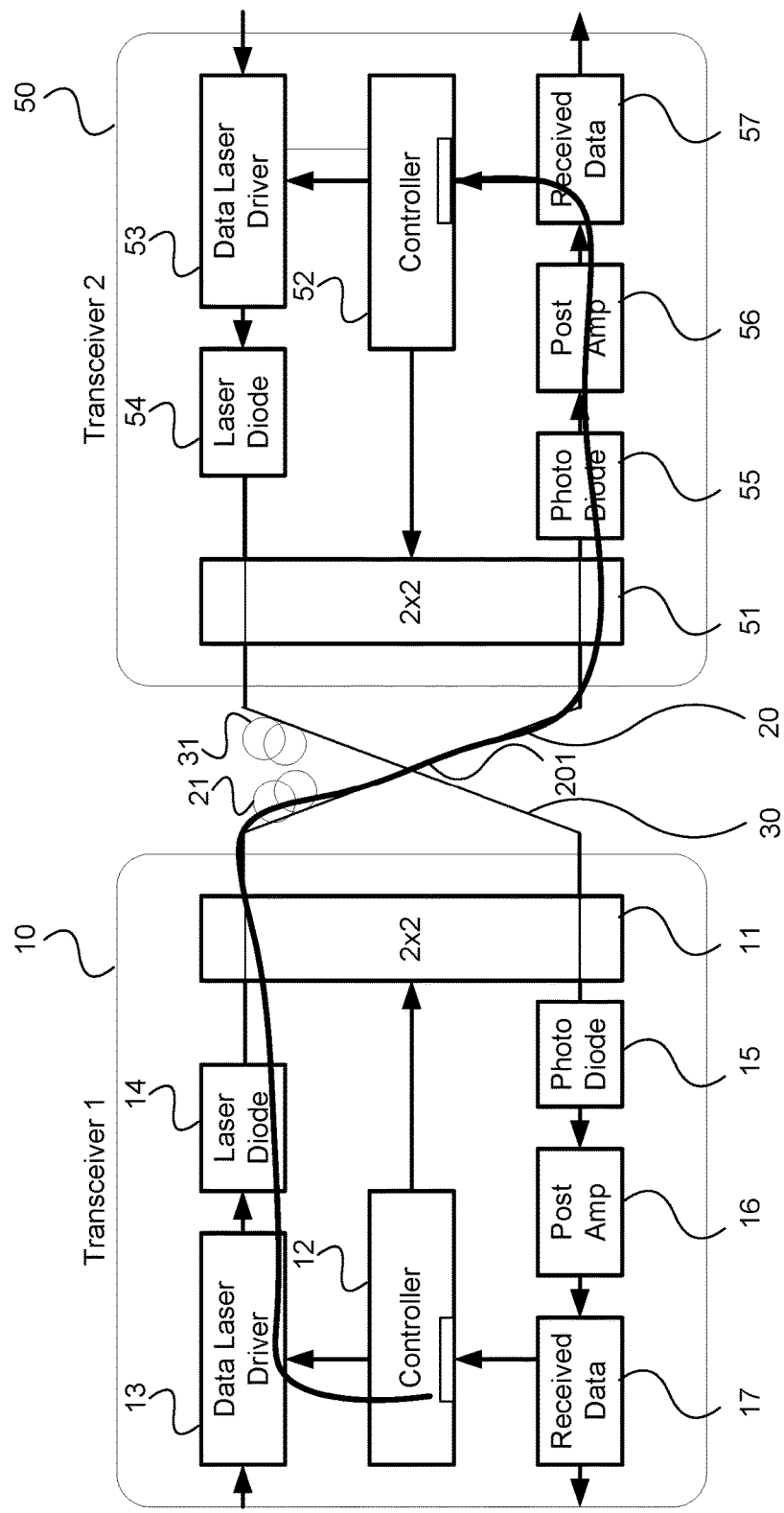
FIGS. 2A, 2B, 2C and 2D illustrate various states of the system in FIG. 1 according to an embodiment.

FIGS. 2A, 2B, 2C and 2D illustrate various states of the system in FIG. 1 according to an embodiment. FIGS. 2A-D also illustrate a method of determining the propagation delay, according to an embodiment. FIG. 2A illustrates the controller 12 of the transceiver 10 generating a series of messages, for example probe messages for transmission to the transceiver 50. The messages are transmitted through the 2×2 switch 11, in the bar state, though the fiber 20 to the transceiver 50 as shown by a signal path 201. The controller 12 stores the time these messages are sent. In some embodiments the time these messages are sent are stored as a time-stamp in each message. The format of the messages can be implementation specific. In some embodiments the messages could use an existing framing protocol, e.g., IP, Ethernet, HDLC, etc., or a proprietary format could be used. In some embodiments only a single message is used. In other embodiments a sequence of messages is used so that averaging can be made to improve accuracy of the measurements, as will be discussed below. As shown by the signal path 201 the message(s) are received at the transceiver 50 and passed through the 2×2 switch 51, which is in the bar state, to the receive portion of the transceiver 50. Accordingly the optical signal is converted to electrical current by the photodiode 55, amplified by the post amplifier 56. Then, the received data module 57 extracts and passes the bits for buffering and processing by the controller 52.

Figure 2B:
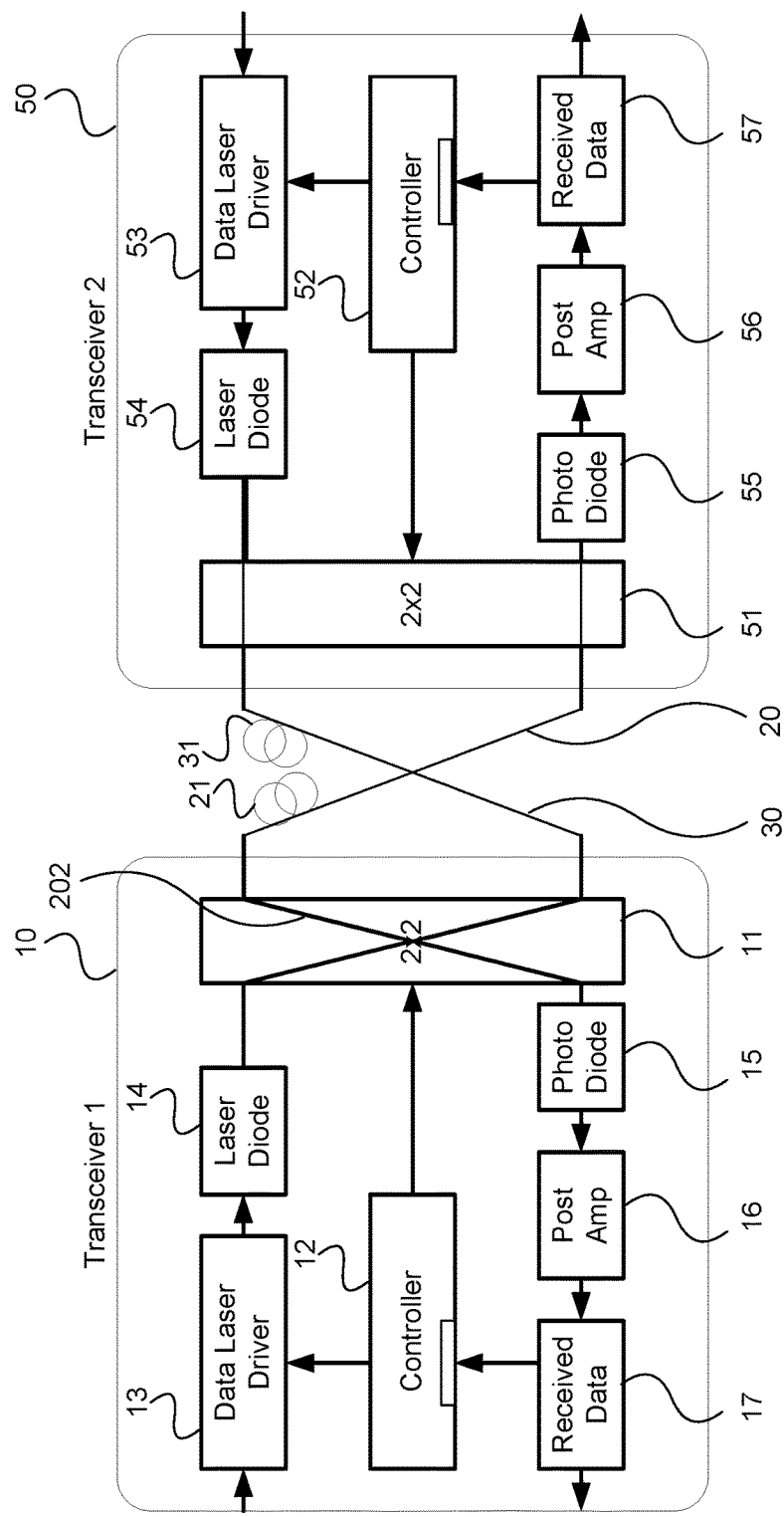

After the message (of the last message in the case of a sequence of messages) is sent, the controller 12 instructs the 2×2 switch 11 to switch to a cross state 202, as illustrated in FIG. 2B. This allows the transceiver 10 to receive reply messages from the transceiver 50 on a same optical fiber, which is the optical fiber 20 in this example.

Figure 2C:
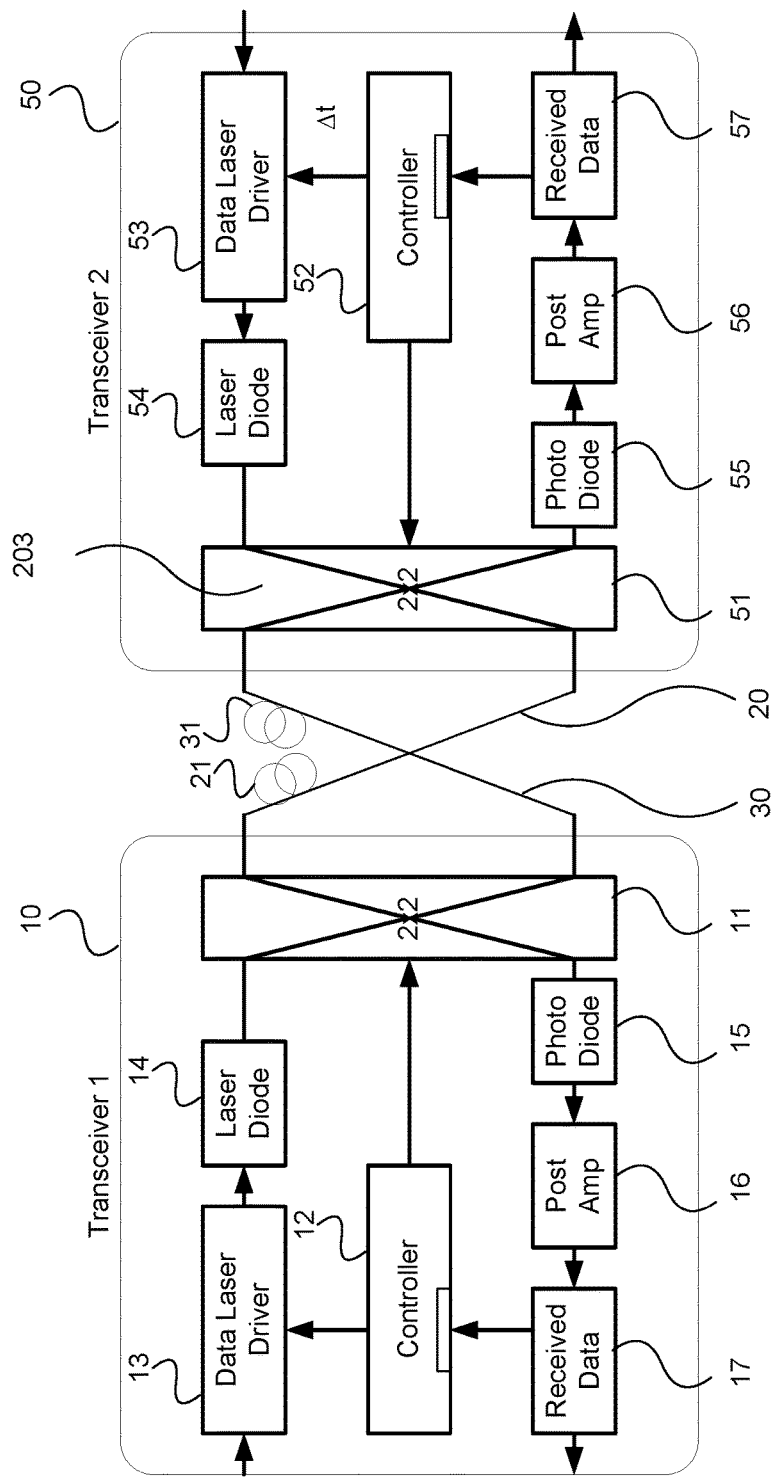
Figure 2D:
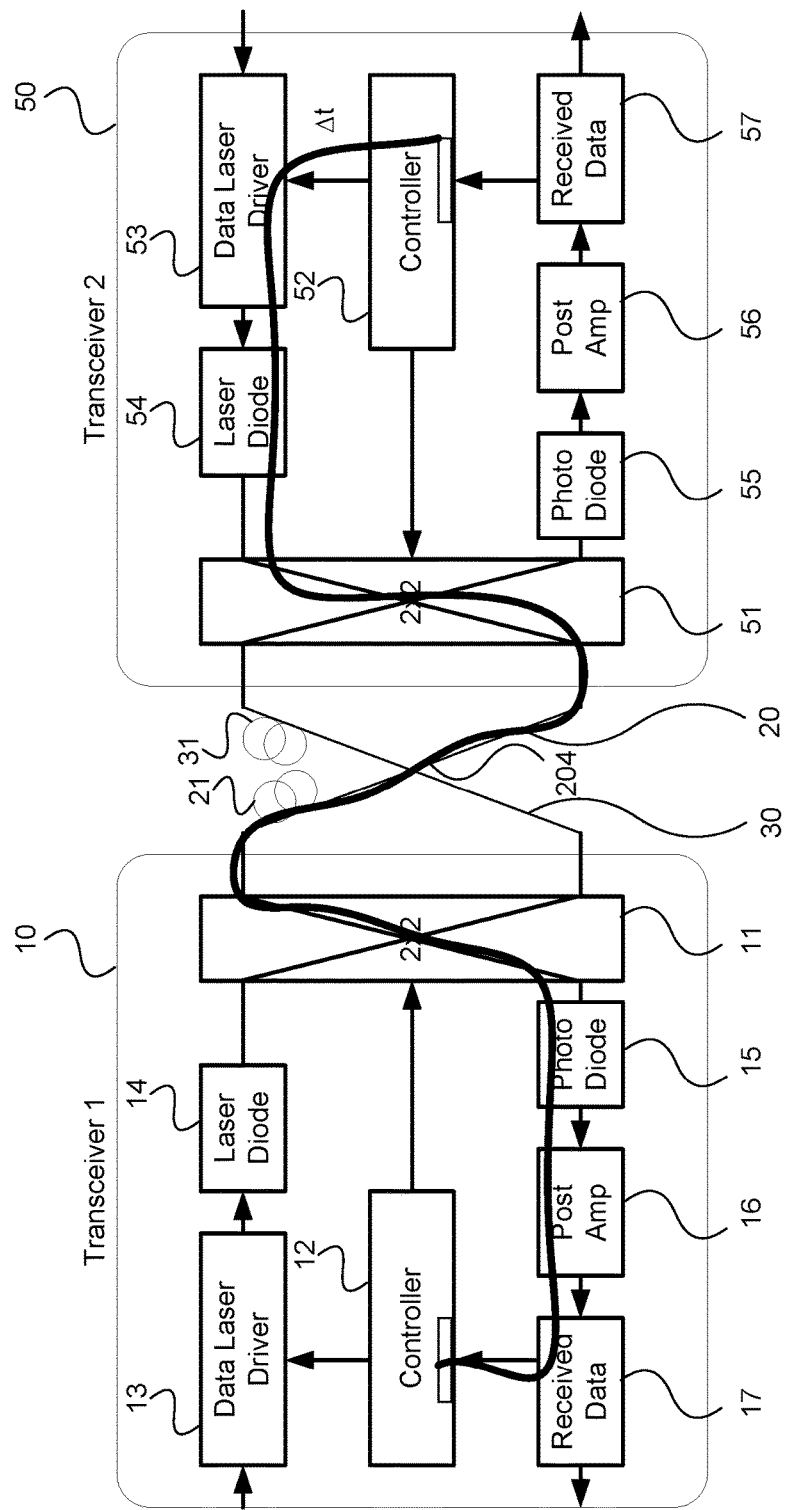

The controller 52 receives the bits for the messages, and stores the time of receipt for each message. The controller 52, upon receipt of messages buffers them and also tracks the wait/processing time $\Delta t$ before the controller 52 sends a reply message for each received message. When the last message of the sequence of messages is received, the controller 52 sets the switch 51 to a cross state 203, as illustrated in FIG. 2C, according to an embodiment. In this manner, the controller 52 configures the transceiver 50 to transmit the reply messages on a same optical fiber from which they are received, namely the optical fiber 20. In some embodiments each reply message includes the received timestamp and the $\Delta t$ value inserted by controller 52. In some embodiments the $\Delta t$ value is determined by the controller 52 for each message, based on actual processing/wait times. As but one example, the controller 52 increments a counter for each clock cycle for each message. In some embodiments, this counter has an initial value of 0. In other embodiments, the initial value of the counter can be set to a number representing the fixed amount of detection time and transmission time at transceiver 50. When the last message arrives and the switch 51 is set up to the cross state 203, these messages can be sent. The value of counter can be sent (raw or converted to actual time based on the clock frequency) to the transceiver 10. If converted to actual time, then the value of Δt is transmitted. Otherwise the counter represents an indication of the internal time, and the receiver (i.e., transceiver 10) can determine the value. In other embodiments the controller 52 estimates the value of Δt. FIG. 2D illustrates the transmission path for the reply messages, according to an embodiment. As can be seen, both of the 2×2 switches 11, 51 are in the cross state for the transmission of the reply message. In some embodiments each controller 12, 52 is configured for an automatic reversion of its corresponding 2×2 switch after T seconds from transmitting the set of messages (e.g., 500 msec) to configure the transceivers for normal operation. Further it is noted that these steps can be repeated for the second optical fiber (i.e., optical fiber 30).

Figure 3:
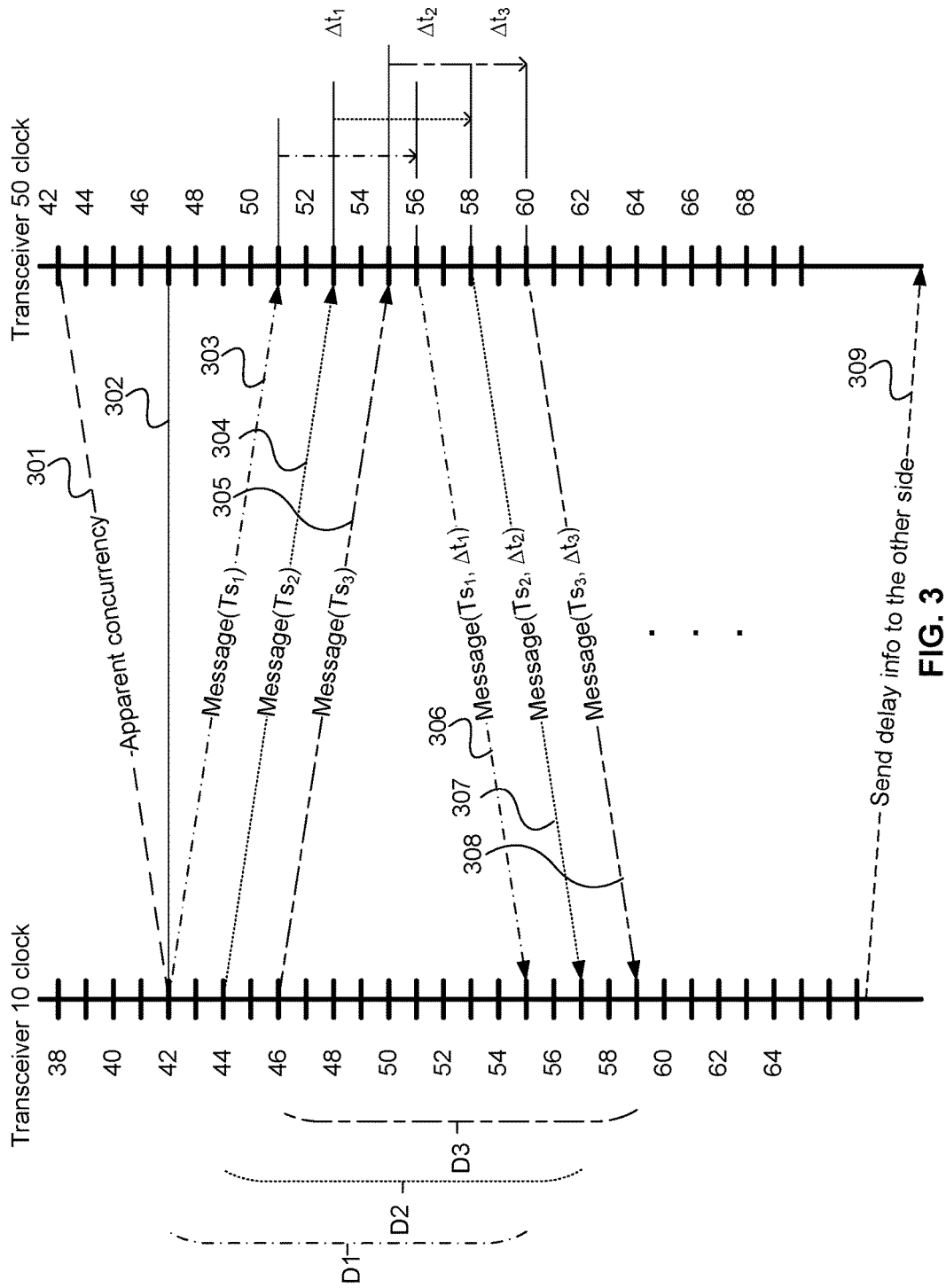
FIG. 3 illustrates a timing diagram according to an embodiment.

FIG. 3 illustrates the timing for 3 messages, according to an embodiment. The left vertical scale shows reference units for the clock of a first transceiver (the transceiver 10). The right vertical scale shows reference units for the clock of a second transceiver (the transceiver 50). A reference line 301 indicates the apparent concurrency between the two reference clocks (i.e., illustrates the points where each reference clock is at a value of 42), whereas a reference line 302 illustrates that the clock for transceiver 2 is offset by 5 reference units. FIG. 3 illustrates 3 messages 303, 304 and 305 transmitted from the transceiver 10 to the transceiver 50, and corresponding reply messages 306, 307 and 308, each with message illustrated with a different dash style. The controller for the transceiver 50 inserts a Δt value ($\Delta t_1$, $\Delta t_2$ and $\Delta t_3$) for each reply message as illustrated to the right of the reference clock for transceiver 50, using the same dash style as the corresponding message. In some embodiments the timestamp ($T_{S1}$, $T_{S2}$, and $T_{S3}$) included in each message 303, 304 and 305 respectively, is included in each reply message 306, 307 and 308 as shown. For each message, the values of $D_1$, $D_2$, and $D_3$ as shown to the left of the reference clock, using the same dash style as the corresponding message, indicate the total time between the transceiver 10 transmitting the message and receiving the corresponding reply message. It is noted that the one way asymmetric delay for each message and reply message is constant (due to the fact that the same optical fiber is used and the speed of light in the fiber is constant). However the values of $D_1$, $D_2$, and $D_3$ include the propagation time for each message (in each direction) and the internal time it takes for transceiver 50 to receive, buffer, process and transmit the corresponding reply message. Accordingly, it is noted that the asymmetric delay includes the propagation delay plus internal processing time. The Δt value for each reply message is an estimate of this internal time. The values $\Delta t_1$, $\Delta t_2$ and $\Delta t_3$ may vary slightly depending on such factors as the load on the transceiver 50, and the measurement error. This is part of the reason a sequence of messages is used, to find an average value which provides a better estimate. In some embodiments, if the samples vary beyond some threshold, the process can be repeated to obtain a better estimate. Accordingly, the number of messages may vary depending on the precision required.

In some embodiments a single message may be sufficient to determine the propagation delay, depending on the accuracy required.

Accordingly, for the embodiment illustrated in FIG. 3, a delay calculation is made for each message as follows:

1-way delay for first message=$(D1-\Delta t_1)/2$ 1-way delay for second message=$(D2-\Delta t_2)/2$ 1-way delay for third message=$(D3-\Delta t_3)/2$ The average value is taken to determine one way propagation delay for the optical fiber in question. As stated above, the process can be repeated to determine the propagation delay for each optical fiber that interconnects two transceivers. In some embodiments these values are used to synchronize the clock of the two transceivers. In some embodiments the first transceiver (e.g., the transceiver 10) will undergo a synchronization process by adjusting its internal clock based on the calculated propagation delay and the $\Delta t_1$, $\Delta t_2$ and $\Delta t_3$ values. In some embodiments the transceiver 10 transmits the calculated one-way propagation delay and its own clock in a message 309 to transceiver 50. This can used so that the second transceiver (e.g., the transceiver 50) can adjust its internal clock.

It should be appreciated that the above calculation includes certain simplifications which will likely suffice for most embodiments. Other embodiments may store and transmit additional information to determine a more precise calculation of the one way delay as:

$$D=(T1-T2-Tt1-Tr2-Td-Tt2-Tr1)/2$$

wherein
T1: Timestamp at Transceiver 10 upon start of transmission;
T2: Time stamp at the Transceiver upon end of a message transmission;
Tt1: Time to transmit a message at transceiver 10;
Tr1: Time to receive a message at transceiver 10;
Tt2: Time to transmit a message at transceiver 50;
Tr2: Time to receive a message at transceiver 50;
Td: Internal time at transceiver 50 (time a message is kept in queue to establish the switch, or receive the rest of sequence, etc); and
D: One way delay.

Figure 4A:
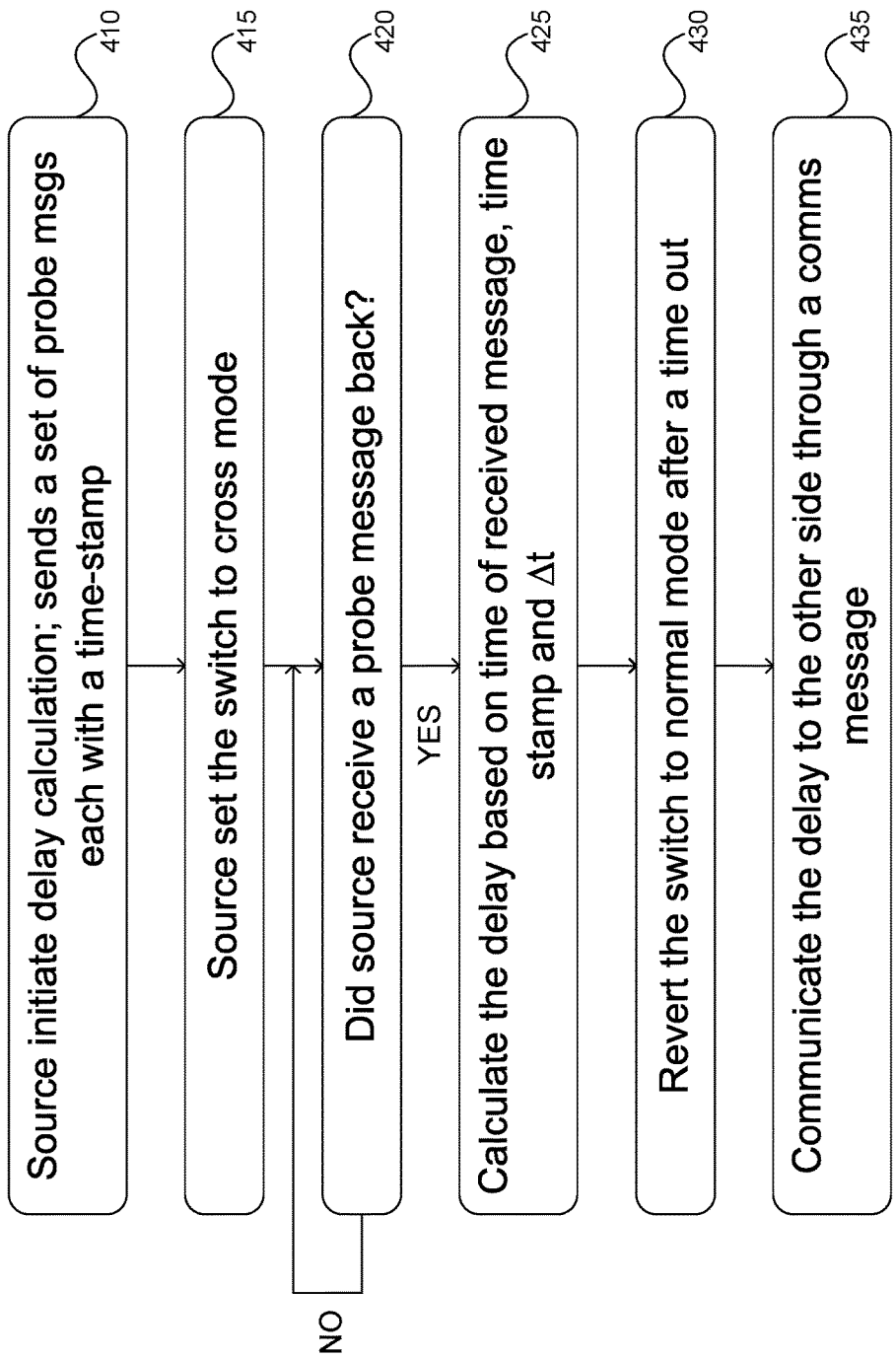
FIG. 4A illustrates a method implemented by the first transceiver according to an embodiment.

FIG. 4A illustrates a method implemented by the controller of the first transceiver (for example the controller 11 of the transceiver 10), according to an embodiment. At step 410, the source transceiver initiates the delay calculation and sends a sequence of probe messages, each with a time stamp. At step 415, the transceiver sets the switch to cross mode. At step 420, the transceiver determines if a subsequent probe message (e.g. a reply to the probe message) was received. If the transceiver determines that it did not receive a probe message, the process waits by returning to step 415. If, at step 425, the transceiver determines that is has received a probe message, it calculates the delay based on the time of the received message, time stamp and Δt. At step 430, the transceiver sets the switch to normal mode (e.g., configures 2×2 switch 11 to the bar state). This setting of the switch to a normal mode may occur after a time out. At step 435, the transceiver 10 communicates the delay to the other side (e.g., transceiver 5) through a communications message. In some embodiments, this message can include the current clock time for the transceiver 10. The bar state and the cross state of both switches can be reversed, in which case the synchronization is achieved by sending signals on the second optical fiber.

Figure 4B:
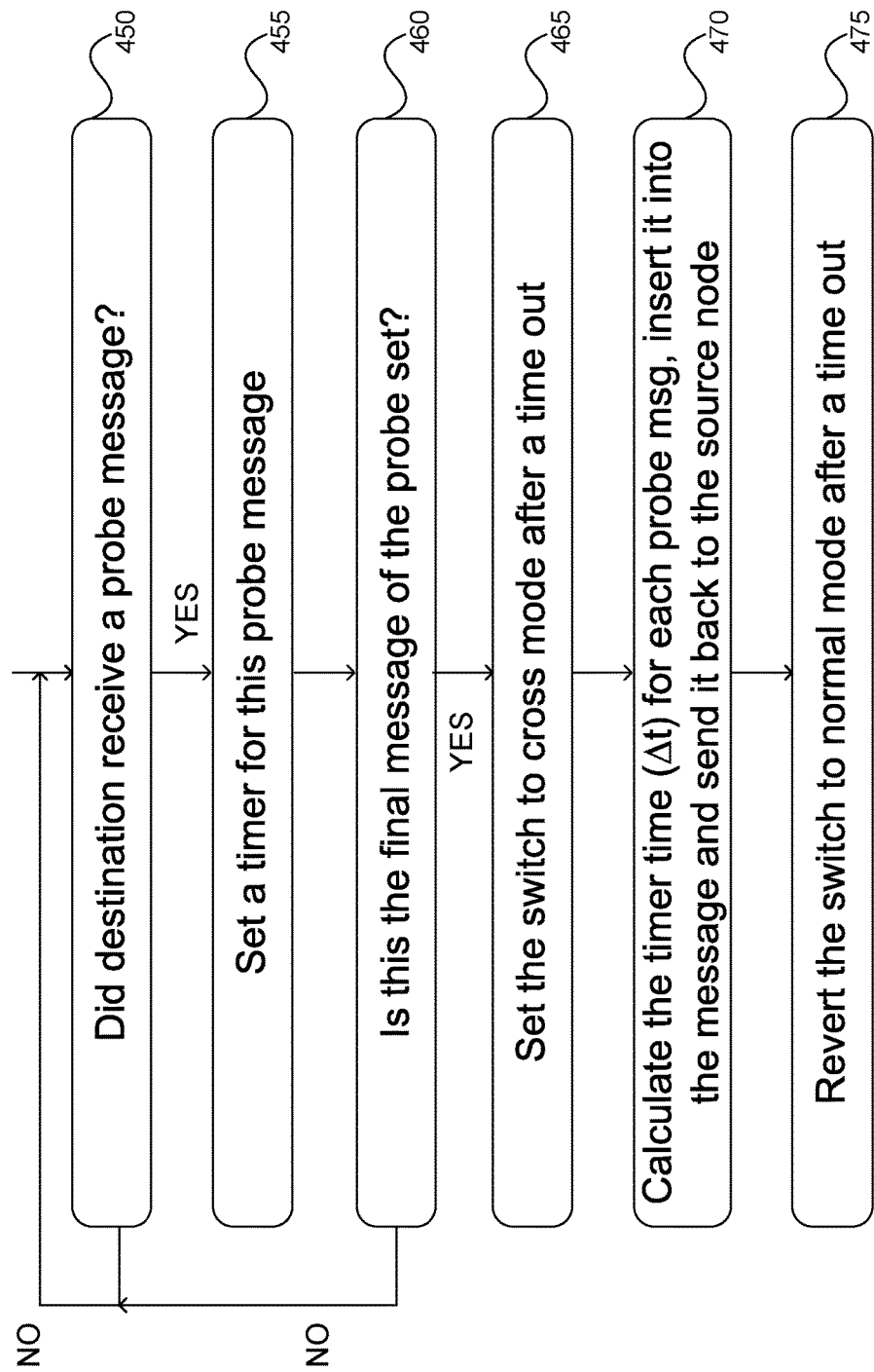
FIG. 4B illustrates a method implemented by the second transceiver according to an embodiment.

FIG. 4B illustrates a method implemented by controller of the second (destination) transceiver (e.g., the controller 52 of transceiver 50), according to an embodiment. At step 450, controller determines if the destination transceiver received the probe message. If the transceiver determines that it did receive a probe message, at step 455, the controller sets a timer (which can be a counter for system clock cycles) for this probe message. At step 460, the controller determines if the final message of the probe is set (i.e., the sequence of messages). If the transceiver determines that it did not receive the final probe message, the process returns to beginning to wait for additional messages. If the transceiver determines that it received the final probe message, at step 465, the controller sets the switch to cross mode after a time out. At step 470, the controller calculate the timer time (Δt) for each probe message, inserts it into each reply message and transmits the reply messages to the source transceiver node (e.g, transceiver 10). At step 475, the controller reverts the switch to normal mode (i.e., bar state) after a time out so that the transceiver can receive and transmit data in its normal operation mode.

Applications for network clock synchronization using the above described systems and methods for determining the propagation delay on each optical fiber will now be discussed, according to embodiments.

Some embodiments utilize symmetric network synchronizing protocols for synchronizing the clocks of the network elements. Some embodiments can utilize a symmetric network synchronizing protocol protocols based on a precision time protocol (PTP), as defined by the Institute of Electrical and Electronic Engineers in Standard for a Precision Clock Synchronization Protocol for Networked Measurement and Control Systems, referred to as IEEE 1588 (2008) (and updates thereof). Some embodiments can utilize a symmetric network synchronizing protocol protocols based on a network time protocol (NTP) as defined in IETF RFC5905 "Network Time Protocol Version 4: Protocol and Algorithms Specification" (and updates thereof).

While the above description discusses methods and systems to determine differences in propagation delay due to different lengths of optical fiber (e.g., different lengths of fibers 21 and 31), there can be other causes of differing propagation delay. For example, optical systems can be affected by temperature, time, pressure and other factors which can change the value of the propagation delay from that calculated during initial set up. Accordingly, some embodiments provide for mechanisms for updating the propagation delay, for ongoing use with symmetric network synchronizing protocols. Non-limiting examples will be discussed using the PTP protocol.

Figure 5:
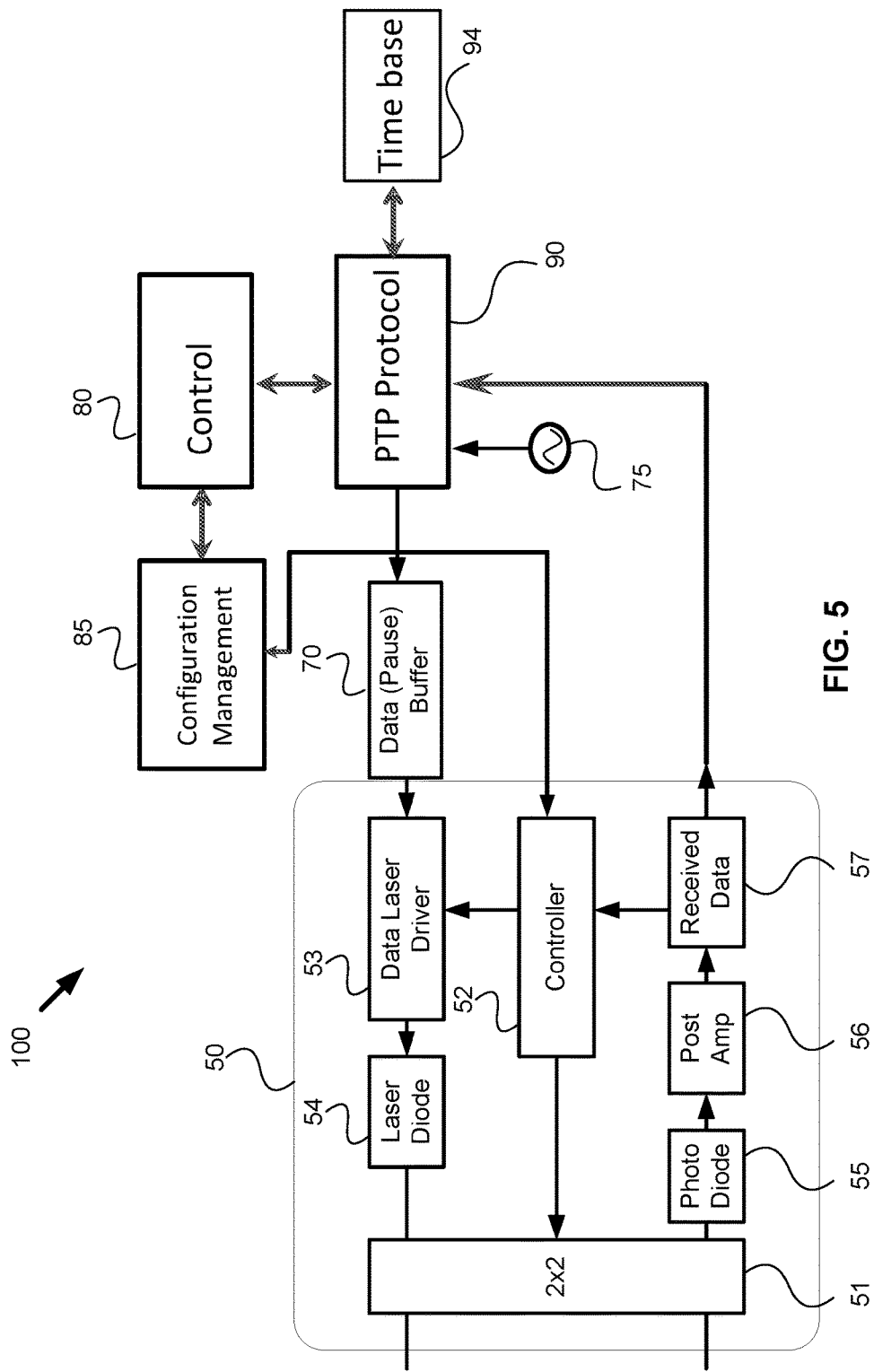
FIG. 5 schematically illustrates a network element including a transceiver and controller for using the transceiver as part of a PTP protocol, according to an embodiment.

FIG. 5 schematically illustrates a network element 100 including a transceiver 50 and controller for using the transceiver as part of a PTP protocol, according to an embodiment.

FIG. 5 includes a Data buffer 70 for buffering traffic data while the transceiver 50 is switched to the second mode of operation (which determines the correction value). Those skilled in the art will appreciate that this may have the effect of temporarily pausing data transmission on the channel. As will be discussed below with reference to FIG. 6, the data can be buffered (paused) at the IP or Ethernet (MAC) level. It should be appreciated that the term "pause" refers to the step where data is buffered when the data cannot be transmitted while the transceiver is switched to the second mode of operation. This allows for the offset in the propagation delay between the two fibers to be determined while the network is operating.

It should be appreciated that not all of the functions will necessarily be required in every device. Depending on the protocol used, some embodiments utilize a master slave protocol between devices, wherein the master instructs the slave to perform a task. Accordingly, some functions will be implemented for a device operating as a master, while other functions will be implemented for a device operating as a slave.

FIG. 5 illustrates a control function, implemented by NE controller 80, which interfaces with a configuration management function 85 and a PTP protocol function 90. It should be understood that these three functions need not necessarily be separated and may be executed by a single controller. The NE controller 80 controls processing of the NE 100 as a whole. Configuration management function 85 sends signaling to the transceiver controller 52. In other embodiments, transceiver does not include a separate controller, in which case the configuration management function 85 controls transceiver, including controlling the state of the switch 51. The PTP protocol function 90, under control of NE controller 80, transmits clock synchronizing messages via the transceiver 50 to the far end network element (not shown) via transceiver 50. These clock synchronizing messages are used by the receiving network element to synchronize the clocks of the devices.

In an example in which the network element of FIG. 5 is operated as a master, the clock synchronizing messages are used by the receiving network element to synchronize the clock of the far end receiver to the clock 75 of the network element 100 of FIG. 5. The clock synchronizing messages include a correction value in accordance with the determined offset adjustment determined with the procedure as described above. For example the determined offset adjustment can be the value D determined above, representing the one way asymmetric delay on the fiber used for transmission from the NE 100 to the far end receiver. The correction value can be the difference between one half of the round trip delay, which is typically used as part of PTP (which assumes symmetric delay on the two fibers), and the value D. The receiving network element can utilize the correction field to compensate for various transit, processing and propagation delays which make up the asymmetric delay.

Similarly, it should be appreciated that NE 100 can be configured as a slave to a far end transmitter. In which case NE controller 80 will synchronize the clock 75 in accordance with clock synchronizing messages received from the far end transmitter.

FIG. 5 illustrates the NE controller 80 interfacing with an PTP protocol function 90 associated with the transmission of PTP messages. It should be appreciated that the NE controller 80 and the PTP protocol function 90 can be executed by the same or different controllers. In some embodiments, the network element 100, which can be implemented as either a master or a slave, can maintain a time-base 94. The time-base may be a local time-base or one representing a global time-base such as, for example, Universal Time Coordinated (UTC), International Atomic time (TAI) or GPS time. In some embodiments, PTP messages can be multiplexed with other user data (not shown). In FIG. 5, two levels of control are shown for simplicity. The controller 52 is associated with functions that are specific to the control of the switching/hardware function, while NE controller 80 is associated with general control of the system including any calculations involving the time-base 94 using the PTP messages. Without loss of generality, both controllers may be implemented as a single controller or as separate controllers. It is pointed out that FIG. 5 schematically illustrates a network element 100. It should be appreciated that a network element can include other elements not germane to the understanding of the embodiments described herein. Furthermore, FIG. 5 is generic and illustrates functions that may be present in either master or slave implementations. In practice, some functions would not necessarily be implemented in either a master or a slave. For example, a master may not implement the Best Master Clock Algorithm (BMCA) and therefore the "data sets" would not be present in the control block. Similarly a slave would not normally implement all external interfaces. For example, a network element operating as a slave may only implement out-bound time/phase/frequency interfaces. Furthermore, as will be discussed below with reference to FIG. 8, a network element can include more than one transceiver. In which case it is possible that some transceivers will operate in slave mode, while others would operate as master.

As stated, the correction value determined in second mode of operation can be utilized to determine a correction value for the symmetric synchronization protocol. For example, IEEE 1588 includes a special correction field that can be used to correct for asymmetry. For example, a common message header is shown below in Table 1. Table 1 is reflective of the common message header as specified in IEEE 1588:

TABLE 1

Common message header

| Bits | | | | | | | | Octets | Offset |
|---|---|---|---|---|---|---|---|---|---|
| 7 | 6 | 5 | 4 | 3 | 2 | 1 | 0 | | |
| transport Specific | | | | | messageType | | | 1 | 0 |
| reserved | | | | | versionPTP | | | 1 | 1 |
| messageLength | | | | | | | | 2 | 2 |
| domainNumber | | | | | | | | 1 | 4 |
| Reserved | | | | | | | | 1 | 5 |
| flagField | | | | | | | | 2 | 6 |
| correctionField | | | | | | | | 8 | 8 |
| Reserved | | | | | | | | 4 | 16 |
| sourcePortIdentity | | | | | | | | 10 | 20 |
| sequenceId | | | | | | | | 2 | 30 |
| controlField | | | | | | | | 1 | 32 |
| logMessageInterval | | | | | | | | 1 | 33 |

IEEE 1588 provides the following synchronization correction field semantics. The correction Field is the value of the correction measured in nanoseconds (ns) and multiplied by $2^{16}$. For example 2.5 ns is represented as $0000000000028000_{16}$. A value of one 1 for all bits, except the most significant, of the field indicates that the correction is too big to be represented. The value of the correction field depends on the message type as described in Table 2, which is reflective of the Correction Field semantics in IEEE 1588 Table 21 reproduced below:

TABLE 2

| correctionField semantics | |
|---|---|
| Message type | correctionField description |
| Sync | Corrections for fractional nanoseconds, residence time in transparent clocks (see 11.5.2), path delay in peer-to-peer clocks (see 11.4.5.1), and asymmetry corrections (see 11.6.2) |
| Delay_Req | Corrections for fractional nanoseconds, residence time in transparent clocks (see 11.5.3), and asymmetry corrections (see 11.6.3) |

TABLE 2-continued

| correctionField semantics | |
|---|---|
| Message type | correctionField description |
| Pdelay_Req | Corrections for fractional nanoseconds, residence time in transparent clocks (see 11.5.4), and asymmetry corrections (see 11.6.4) |
| Pdelay_Resp | Corrections for fractional nanoseconds, residence time in transparent clocks (see 11.5.4), and asymmetry corrections (see 11.6.5) |
| Follow_Up | Corrections for fractional nanoseconds, residence time in transparent clocks (see 11.5.2), path delay in peer-to-peer clocks (see 11.4.5.1), and asymmetry corrections (see 11.6.2) |
| Delay_Resp | Corrections for fractional nanoseconds, residence time in transparent clocks (see 11.5.3), and asymmetry corrections (see 11.6.3) |
| Pdelay_Resp_Follow_UP | Corrections for fractional nanoseconds, residence time in transparent clocks (see 11.5.4), and asymmetry corrections (see 11.6.4 and 11.6.5)) |
| Announce | Zero |
| Signaling | Zero |
| Management | Zero |

From an examination of the above, it should be clear that IEEE 1588 provides correction for propagation delay, using a single propagation delay value for the connection between two nodes. Consideration of different values for each direction between the nodes is not provided. By being able to determine a per-direction based timing offset for each link, embodiments of the present invention can use IEEE 1588 type messages, but can account for differences associated with directivity.

Figure 6A:
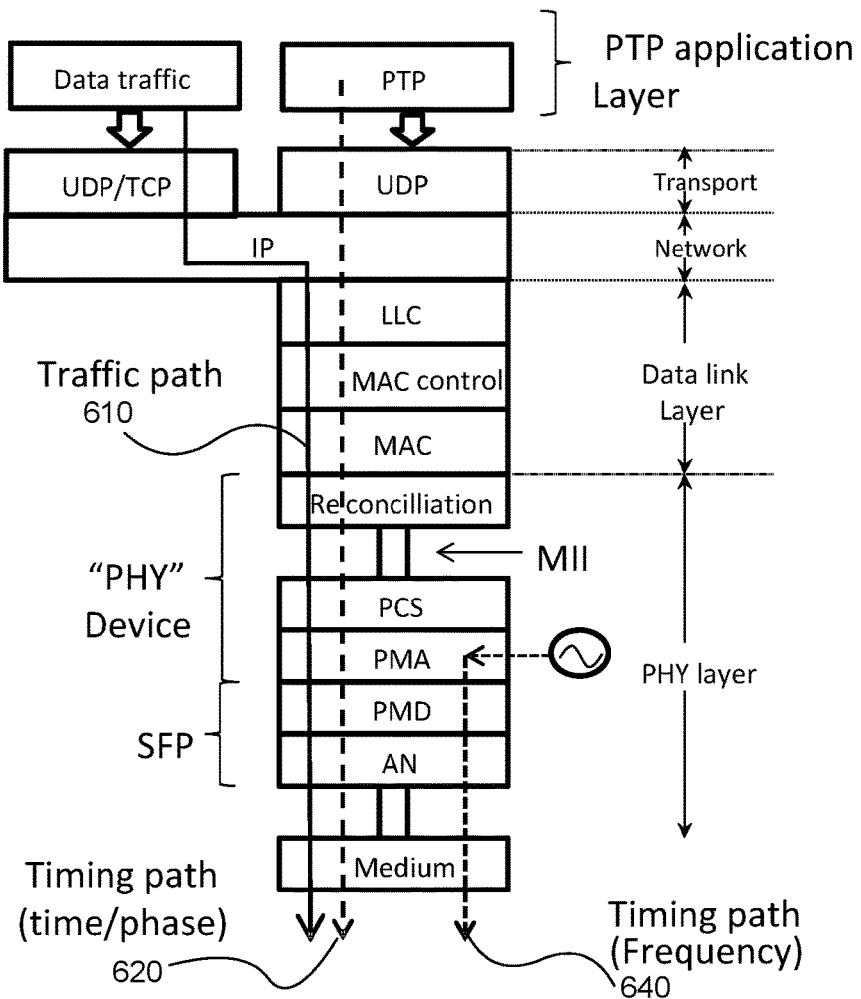
FIG. 6A schematically illustrates a protocol stack for a network element.

FIG. 6A schematically illustrates a protocol stack for a conventional network element utilizing a PTP protocol. FIG. 6A illustrates a protocol stack, including transport, network, data link and physical (PHY) layers for transporting data traffic (which can be backhaul traffic or traffic from wireless access points, or "front-haul" traffic from an antenna to a BBU), as well as a PTP application layer. The Transport layer can be UDP or TCP. The network layer is typically IP. The data link layer includes LLC, MAC Control, and MAC elements (assuming an Ethernet data link layer). The Physical layer includes Reconciliation and a Media Independent Interface (MII) to a Physical Coding Sub-layer (PCS), Physical Medium Attachment (PMA), Physical medium Dependent (PMD) and AN layers to transport data on the physical medium. FIG. 6A also illustrates the traffic path 610, the PTP protocol timing path 620 which carries time and phase information as part of the PTP messaging, as well as the timing path 64 carrying the clock frequency.

Figure 6B:
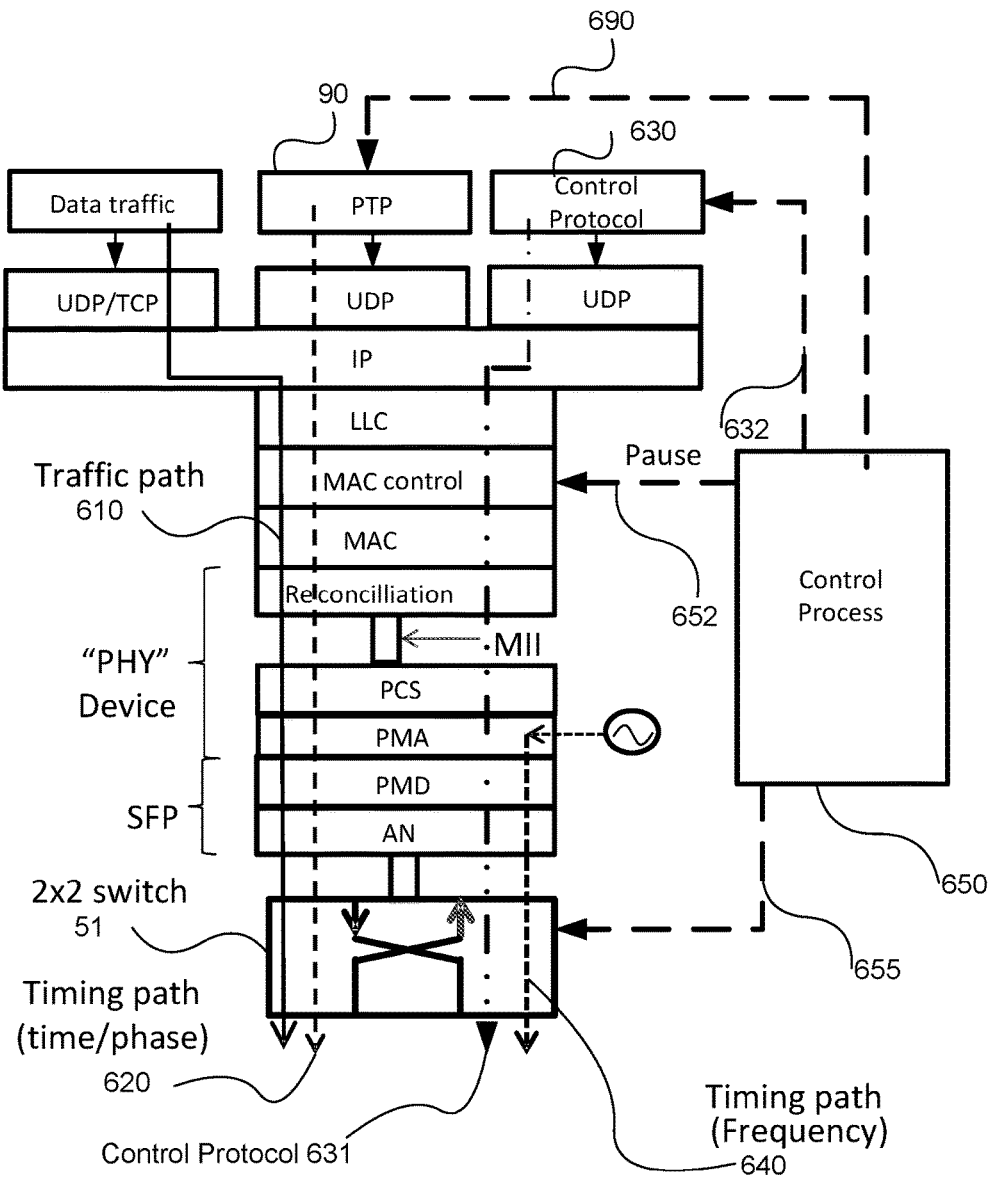
FIG. 6B schematically illustrates a control process utilizing a protocol stack for such a network element, according to an embodiment.

FIG. 6B schematically illustrates a control process for a network element utilizing a protocol stack according to an embodiment. FIG. 6B illustrates such a process for a network element of FIG. 5, according to an embodiment. FIG. 6B illustrates the data path 610, PTP protocol messages 620 (from PTP protocol 90) and control protocol messages 631 from Control protocol 630. The PTP protocol 90 corresponds to the PTP protocol function 90 of FIG. 5. The PTP protocol messages 620 include the clock synchronization messages, which include the general PTP clock information as discussed below. When a control message or flag is received to implement the offset adjustment procedure for determining the one way propagation delays, the control process 650 implements a pause 652. This includes buffering data in data buffer 70 (as shown in FIG. 5). In FIG. 6 this pause function is implemented at the Ethernet layer (as a pause at the MAC control), but it should be appreciated that in other embodiments, an IP pause can be implemented by buffering data at the IP level. The Control process 650 then sends switch control message 655 for controlling the state of the 2×2 switch 51. The control protocol 630 includes sending (and receiving, although only the transmit path is shown) the control messages 631 discussed with reference to FIGS. 2A-2D, 3, 4A and 4D for determining the one way propagation delay. The control protocol can be controlled by control messages 632, but it should be appreciated that the Control process 650 and the control protocol 630 can be implemented as a single control function, for example executing on NE controller 80 of FIG. 5. It should be appreciated that control protocol messages 631 and PTP protocol messages 620, as well as timing path clock information 640 can still be transmitted during the second mode of operation (during which the data traffic is paused/buffered). It should be appreciated that the PTP protocol can implement clock adjustments with much greater frequency than the frequency of switching to the second mode of operation to determine any changes in the one way propagation delays.

In general a PTP clock has multiple components: a hardware component, a protocol component, a transport component (e.g. Ethernet, OTN, etc.) for path-based networks, and a software component (e.g processing timestamps, management etc.). PTP clocks are defined in terms of ports as either master or slave. The Protocol component operates within a device (hardware) over a link (transport component) that is bounded by one master and one slave port. Messages contained within the PTP protocol are processed outside of the protocol stack itself in a software component (for example the PTP protocol function 90. This can include calculation of clock timing messages, determining topology using Best Master Clock Algorithm, maintaining time-scales, clock management, etc. Accordingly, the PTP protocol messages are labeled as a timing path which includes time and phase of the PTP clock. Further, in some embodiments, while the messages can be processed in software, some hardware assistance is possible to accommodate the processing time of the protocol stack itself. For example, the PTP protocol attempts to increase the accuracy by supporting hardware based time-stamping, however, some inaccuracies due to asymmetry may still remain. However, such inaccuracies should be within tolerable limits for most applications.

Figure 7:
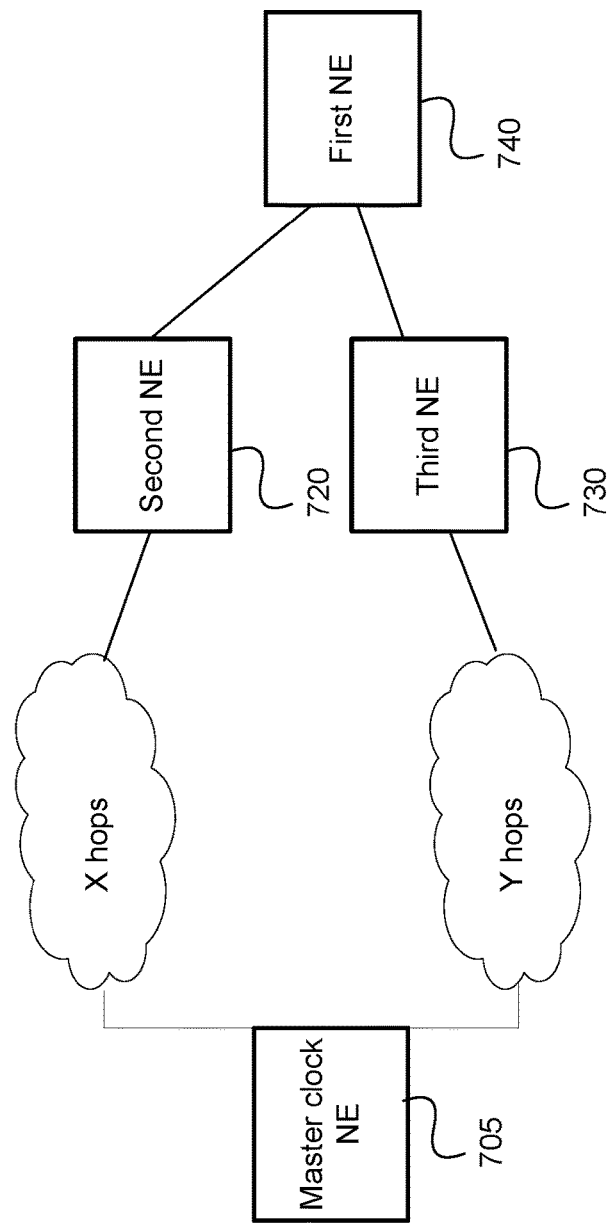
FIG. 7 illustrates a series of network elements in a network, according to an embodiment.

FIG. 7 illustrates a series of network elements in a network, according to an embodiment. FIG. 7 illustrates a network which can utilize a symmetric network synchronizing protocol to synchronize clocks of each network element 720, 730 and 740 to that of a master clock NE 705. In FIG. 7, second NE 720 is X hops away from the master clock NE 705 (i.e, there are X intermediate NEs between NE 705 and NE 720) and third NE 730 is Y hops away from the master clock NE 705 (i.e, there are Y intermediate NEs between 705 and NE 730).

Figure 8:
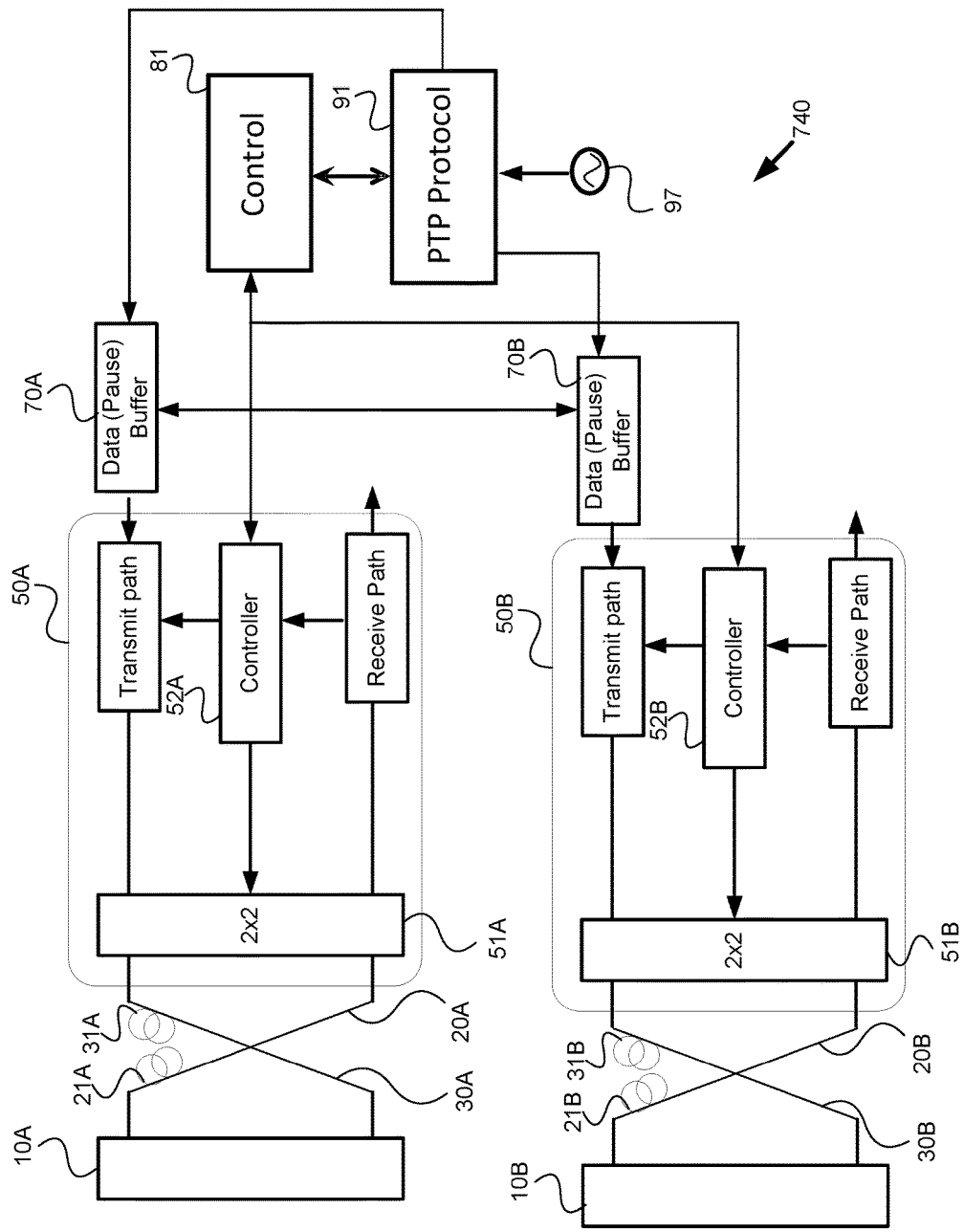
FIG. 8 illustrates a network element implementing a PTP protocol with more than one transceiver, according to an embodiment.

FIG. 8 illustrates a network element implementing a PTP protocol with more than one transceiver, according to an embodiment. In one example, FIG. 8 illustrates part of the first NE 740 of FIG. 7, as well as a receiver 10A of the second NE 720 of FIG. 7 and a receiver 10B of the third NE 730 of FIG. 7.

FIGS. 7 and 8 combined illustrate methods and systems for synchronizing clocks between network elements. For example FIG. 8 illustrates a first network element 740 which includes transceivers 50A and 50B as well as NE clock 97, control function 81 and PTP protocol function 91. Although a single PTP protocol function 91 is illustrated, it should be appreciated that a PTP protocol is run on a per-link basis. Transceiver 50A, which may be an SFP, uses optical fibers 20A and 30A to communicate with receiver 10A of a second network element 720. These optical fibers may have different lengths, schematically illustrated by coils 21A and 31A. In a normal mode of operation, transceiver 50A transmits on a first optical fiber 30A and receives on a second optical fiber 20A. Transceiver 50B, which may be an SFP, uses optical fibers 20B and 30B to communicate with transceiver 10B of the third network element 730. In a normal mode of operation, transceiver 50B transmits on a third optical fiber 30B and receives on fourth optical fiber 20B. These optical fibers may have different lengths, schematically illustrated by coils 21B and 31B. The control function 81, possibly in conjunction with a configuration management function (not shown), communicates with the controllers 52A, 52B of each transceiver. PTP protocol messages are sent to the transmit path of each receiver through links (not shown). The control function 81, in conjunction with the PTP protocol 91 receives information from the clock synchronizing messages from both the transceiver 10A of the second NE 720 of FIG. 7 and from the transceiver 10B of the third NE 730 of FIG. 7. To avoid cluttering the figure, the links from the receive paths of each transceiver to the PTP protocol function are not shown. It should be appreciated that a network element can have other elements not shown, such as a time-base and a PTP boundary clock.

During system startup, and also from time to time in order to compensate for changes due to time, temperature, pressure, etc., the NEs can be configured to determine correction values dependent on the one way propagation delays on each of fibers 20A, 30A, 20B and 30B using approaches discussed above. Control function 81 can receive control messages based on set time periods, or from sensors which determine changes in temperature and pressure to reconfigure the 2×2 switches to determine the one way propagation delays for each fiber. For example such a control message can be received responsive to a measured change in temperature exceeding a threshold, or at a predetermined time, or in response to protection events or changes in network topology. In other cases, as data traffic is paused while the correction value procedure is executed, such procedure can be executed responsive to a measured drop in data traffic below a threshold. During these times, data traffic to be transmitted is buffered by data buffers 70A, 70B. As discussed above with respect to FIG. 6, this can be implemented by means of an IP pause at the IP layer, or an Ethernet pause at the MAC layer.

During ongoing operations, the control function 81, in conjunction with the PTP protocol function 91 receives a first clock synchronizing message from the second network element according to the PTP protocol, the first clock synchronizing message including a first correction value in accordance with a determined first offset adjustment. The control function 81, in conjunction with the PTP protocol function 91 also receives a second clock synchronizing message from the third network element, the second clock synchronizing message including a second correction value in accordance with a determined second offset adjustment. The control function 81, in conjunction with the PTP protocol function 90 uses these messages to synchronize the clock 97 of the first network element to the clock of one of the second network element 10A and the third network element 10B. In some embodiments, the control function 81 can synchronize to the clock of the network element with the least number of hops from the master network element. For example, referring again to FIG. 7, if X<Y then control function 81 will choose to synchronize to the clock of the second NE 720. For example the first network element 740 can receive the number of hops between the second network element 720 and the master network element 705 as part of control or packet field. Similarly, the first network element 740 can receive the number of hops between the third network element 730 and the master network element 705.

As stated the first NE can be switched into a second mode of operation to determine the above mentioned first and second offset adjustments. The first offset adjustment depends on the difference in propagation delay between the first network element 740 and the second network element 720 (transceiver 10A) on the first optical fiber 30A and between the first network element 740 and the second NE 720 on the second optical fiber 20A. The second offset adjustment depends on the difference in propagation delay between the first network element 740 and the third network element 740 (transceiver 10B) on the third optical fiber 30B and between the first network element and the third network element 730 on the fourth optical fiber 20B. As discussed above the determined offset adjustment can be the value D determined above, representing the one way propagation delay on each fiber. The correction value can be the difference between one half of the round trip delay, which is typically used as part of PTP (which assumes symmetric delay on the two fibers), and the value D.

Figure 9:
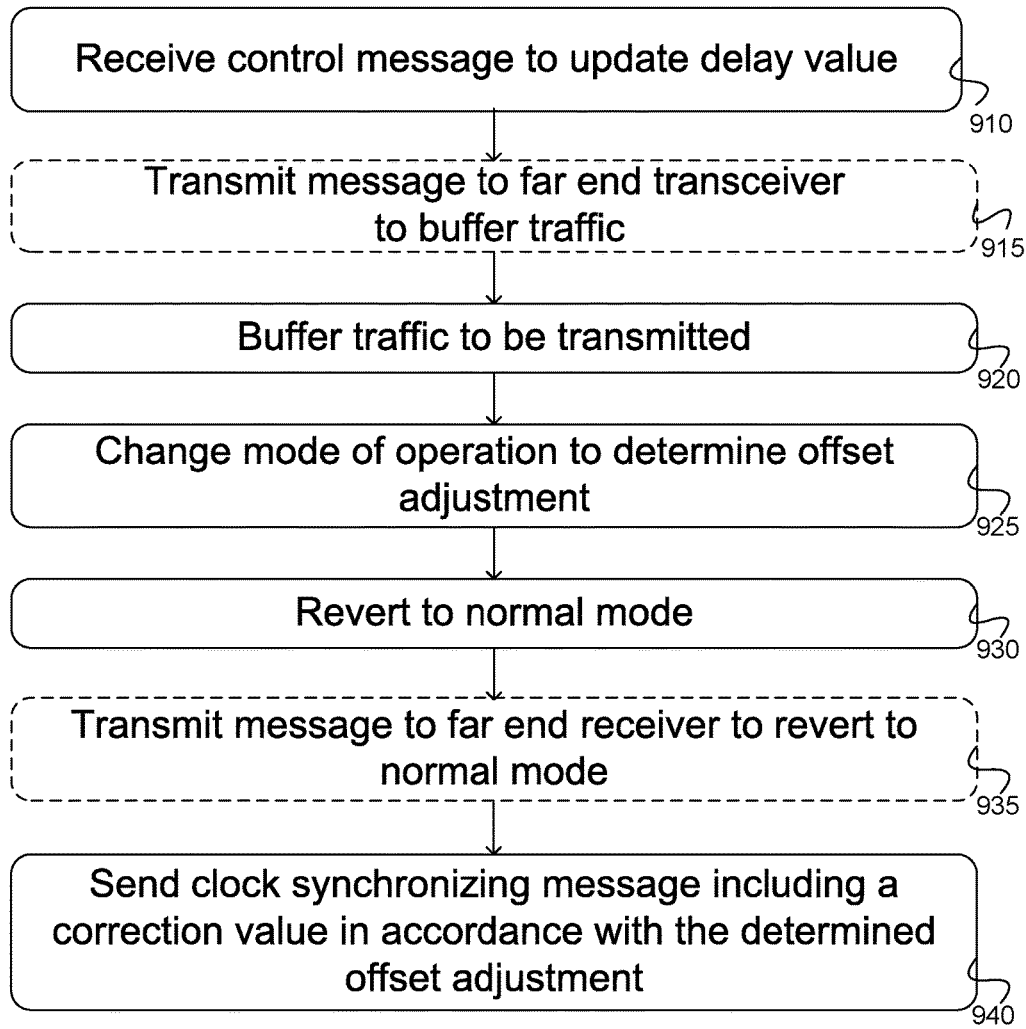
FIG. 9 is a flowchart illustrating a method executed by controller of a network element for network synchronization, according to an embodiment.

FIG. 9 is a flowchart illustrating a method executed by controller of a network element for network synchronization, according to an embodiment. At step 910, the controller receives control message to update delay value 910. Details of conditions which can trigger such a control message include network configuration changes, at predetermined time periods, in response to measured changes in temperature (or pressure), etc. Depending on the configuration, at step 915 the controller transmits a message to far end transceiver to buffer traffic. This step is shown in dashed, as it may be implemented by a different controller in a network, especially when multiple nodes can be affected. At step 920 the controller implements a pause function. As discussed above, this can involve buffering data the IP or Ethernet (MAC) layer. The controller than changes the mode of operation of the transceiver(s) from a normal mode of operation to a second mode of operation to determine the offset adjustment(s) 925, for example as discussed above with reference to FIGS. 2A-2D, 3, and 4A-4B. At step 930 the controller than instructs the transceiver(s) to revert to the normal mode of operation for data traffic transmissions. At step 935, depending on the configuration, the controller transmits message to far end receiver to revert to normal mode. At step 940 the controller sends clock synchronizing message including a correction value in accordance with the determined offset adjustments, according to the network synchronization protocol being used. In some embodiments, the system can determine the one way propagation delay in each fiber. In some embodiments, the system can determine the one way propagation delay in one of the fibers, and then revert to the normal mode of operation to determine the round trip delay. In some such embodiments, the step of determining the offset adjustment for differences in asymmetric propagation delay between the first node and the second node on the first optical fiber and between the first node and the second node on the second optical fiber includes subtracting the one way propagation delay of the first optical fiber from the round trip delay to determine the one way propagation delay of the second optical fiber.

It should be appreciated that the embodiments discussed herein have discussed methods and systems for improving on symmetric network synchronizing protocols such as PTP by compensating for errors introduced using such protocols due to asymmetric differences in propagation delays. It should be appreciated that the methods and systems discussed herein could lead to the development of network synchronizing protocols which need not be based on assumptions of symmetry.

In some embodiments, the second mode of operation is utilized to determine the one way propagation delays in order to determine correction values to use for a symmetric network synchronizing protocol, such as PTP. This allows for synchronizing clocks using the PTP protocol. Some such embodiments require little or no change to the operation of the PTP protocol. In some embodiments, timing messages according to a symmetric network synchronizing protocol can be exchanged without requiring such correction values, by utilizing the second mode of operation to exchange timing messages (e.g., time-stamps) on the same fiber. This allows synchronizing of the clocks of a first node and a second node directly using an exchange of timing messages according to a symmetric network synchronizing protocol on the same fiber. It should be appreciated that while a single optical fiber may not be perfectly bidirectionally symmetric, especially if different wavelengths are transmitted in the different directions, any such differences will be with tolerable limits for most applications. For example, the clocks of the first node and the second node can be synchronized by transmitting a timing message from the first node to the second node on the first optical fiber, and then changing the mode of operation from a normal mode of operation to a second mode of operation to receive a reply message according to the symmetric network synchronizing protocol on the first fiber. As discussed above a symmetric network synchronizing protocol can synchronize clocks using 4 timestamps (T1, T2, T3 and T4). For example, the first node can send a timing message including T1 on the first fiber. The controllers of both the first node and the second node then change the state of the 2×2 switches such that the second node can transmit a reply message. The second node determines the time-stamps T2 (time second node received the timing message) and T3 (the time the second node transmits the reply message). The first node determines time-stamp T4 (the time the first node receives the reply message). In some embodiments, the second node transmits T2 and T3, and the first node, now in possession of all 4 timestamps can determine clock adjustments. In other embodiments, the first node can transmit T4 to the second node, which can then determine clock adjustments based on the 4 timestamps (assuming the second node stored the values of T1, T2 and T3). It should be appreciated that the controllers can revert the switches back to the normal mode of operation, either before or after the first node transmits the message including T4.

Figure 10:
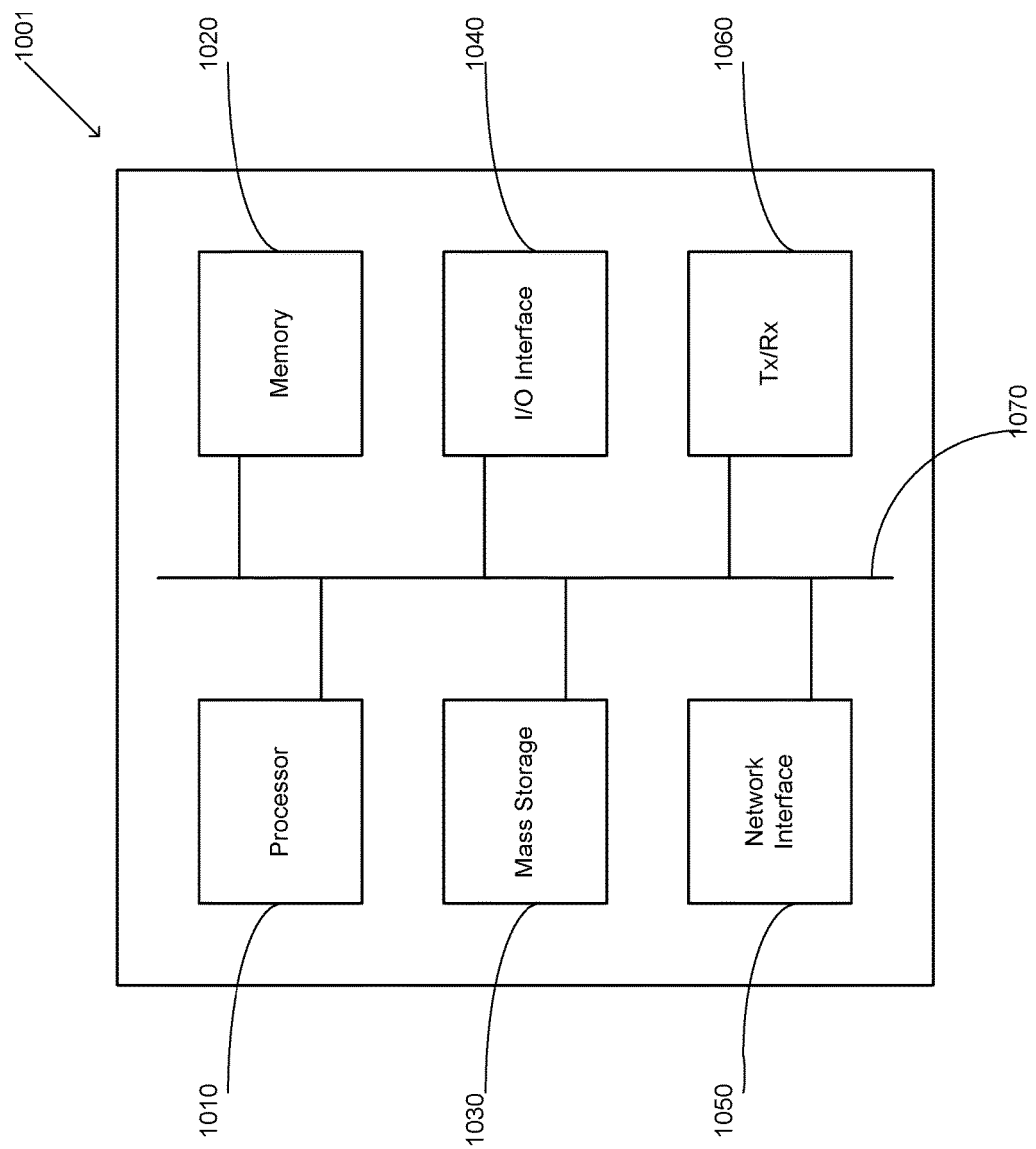
FIG. 10 is an exemplary block diagram of a processing system that may be used for implementing a network element according to an embodiment.

FIG. 10 is an exemplary block diagram of a processing system 1001 that may be used for implementing a network element as discussed. As shown in FIG. 10, processing system 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements.

Further, the processing system 1001 may contain multiple instances of certain elements, such as multiple processors, memories, or transceivers. Also, elements of processing system 1001 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps. In particular, the memory can include machine readable instructions which when executed by the processor implement the control functions and symmetric synchronization protocol functions (e.g., the PTP protocol functions) discussed herein.

The processing system 1001 can be used to implement network element as described herein.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A method for synchronizing clocks in a network, the method performed by a controller of a first node having a transceiver connected to a second node by a first optical fiber and a second optical fiber, the method comprising:
receiving a control message, containing an instruction to send to the second node a symmetric network synchronizing protocol clock synchronizing message;
subsequent to receiving the control message, determining a one way asymmetric propagation delay associated with the first optical fiber in accordance with a time stamp associated with a time stamp message transmitted to the second node on the first optical fiber by the controller in a normal mode of operation and a reply message received by the controller in a second mode of operation in response to the transmitted time stamp message received over the first optical fiber, where while in the second mode of operation transmission of data to the second node over the first fiber is paused; and
transmitting the clock synchronizing message, to the second node over the first optical fiber, with a correction value determined in accordance with the determined one way asymmetric delay.

2. The method of claim 1 wherein determining the asymmetric propagation delay further comprises reverting the mode of operation from the second mode of operation to the normal mode of operation after receiving the reply message.

3. The method of claim 1 further comprising determining a one way asymmetric propagation delay associated with the second optical fiber in accordance with a determined round trip delay and the determined one way asymmetric delay of the first optical fiber.

4. The method of claim 1 further comprises buffering data traffic between transmission of the time stamp message to the second node and receipt of the response to the transmitted time stamp message for transmission after receipt of the response.

5. The method of claim 1 wherein the control message is received responsive to at least one of: a measured change in temperature exceeding a threshold; and a measured drop in data traffic below a threshold.

6. The method of claim 1 wherein timing synchronization using the symmetric network synchronizing protocol is subject to error associated with an asymmetry in the propagation delays between the first optical fiber and the second optical fiber.

7. The method of claim 6 wherein the symmetric network synchronizing protocol includes a correction field to compensate for propagation delays between the first and second nodes, and wherein the method further includes updating the correction field with the correction value.

8. The method of claim 7 wherein the symmetric network synchronizing protocol is a precision time protocol.

9. The method of claim 7 wherein the symmetric network synchronizing protocol is a network time protocol.

10. The method of claim 1 wherein both the first node and the second node comprise a transceiver including a 2×2 switch for switching a connection from either of the pair of optical fibers and a transmit portion of the transceiver and a receive portion of the transceiver, and changing the mode of operation further comprises switching the state of the 2×2 switches between a transmit step and a receive step such that both a transmit time stamp message and a receive time stamp message traverse the same optical fiber.

11. A method for synchronizing clocks between a first network element, a second network element and a third network element, the first network element transmitting data traffic to the second network element on a first optical fiber in a normal mode of operation and a receiving data traffic from the second network element on a second optical fiber and the first network element transmitting data traffic to the third network element on a third optical fiber and receiving data traffic from the third network element on a fourth optical fiber in a normal mode of operation, the method performed by the first network element, the method comprising:
receiving a first clock synchronizing message from the second network element using a symmetric network synchronizing protocol, the first clock synchronizing message including a first correction value in accordance with a determined first offset adjustment;

receiving a second clock synchronizing message from the third network element using a symmetric network synchronizing protocol, the second clock synchronizing message including a second correction value in accordance with a determined second offset adjustment; and synchronizing the clock of the first network element to the clock of one of the second network element and the third network element;

wherein the first offset adjustment depends on differences in propagation delay between the first network element and the second network element on the first optical fiber and between the first network element and the second element on the second optical fiber;

the second offset adjustment depends on differences in propagation delay between the first network element and the third network element on the third optical fiber and between the first network element and the third network element on the fourth optical fiber.

12. The method of claim 11 wherein the symmetric network synchronizing protocol synchronizes different network elements to a clock of a master network element and wherein synchronizing the clock of the first network element to the clock of one of the second network element and the third network element includes synchronizing to the clock of the network element with the least number of hops from the master network element.

13. The method of claim 12 wherein the method further comprises:

receiving the number of hops between the second network element and the master network element; and receiving the number of hops between the third network element and the master network element.

14. The method of claim 13 wherein:

the first offset adjustment is determined responsive to the first network element and the second network element exchanging time stamp messages in a second mode of operation; and the second offset adjustment is determined responsive to the first network element and the third network element exchanging time stamp messages in a third mode of operation.

15. A network element comprising:

an interface for receiving data traffic to be transmitted over a first optical fiber;

a transceiver for transmitting over the first optical fiber and receiving over a second optical fiber; and a controller of a first node having the transceiver connected to a second node by the first optical fiber and the second optical fiber, the controller including a processor and machine readable memory storing machine executable instructions which when executed by the processor cause the controller to configure the network element to:

receive a control message, containing an instruction to send to the second node a symmetric network synchronizing protocol clock synchronizing message;

subsequent to receiving the control message, determine a one way asymmetric propagation delay associated with the first optical fiber in accordance with a time stamp associated with a time stamp message transmitted to the second node on the first optical fiber by the controller in a normal mode of operation and a reply message received by the controller in a second mode of operation in response to the transmitted time stamp message received over the first optical fiber, where while in the second mode of operation transmission of data to the second node over the first fiber is paused; and transmit the clock synchronizing message, to the second node over the first optical fiber, with a correction value determined in accordance with the determined one way asymmetric delay.

16. The network element of claim 15 wherein the controller is further configured to buffer data traffic between transmission of the time stamp message to the second node and receipt of the reply message.

17. The network element of claim 16 wherein the symmetric network synchronizing protocol includes a correction field to compensate for different propagation on the first optical fiber and the second optical fiber and wherein the machine readable instructions further cause the controller to update the correction field with the correction value.

18. The network element of claim 17 wherein the symmetric network synchronizing protocol is a precision time protocol.

19. The network element of claim 17 wherein the network element is configured to operate in a master mode.

20. The network element of claim 17 wherein the network element is configured to operate in a slave mode.

* * * * *